United States Patent
Greinke et al.

(10) Patent No.: US 12,413,286 B2
(45) Date of Patent: Sep. 9, 2025

(54) BEAM MANAGEMENT USING SPARSE ANTENNA ARRAYS

(71) Applicant: Viasat Inc., Carlsbad, CA (US)

(72) Inventors: Brian G. Greinke, Carlsbad, CA (US); John Bacigalupi, Carlsbad, CA (US); Parker Robinson, Ocala, FL (US)

(73) Assignee: Viasat, Inc., Carlsbad, CA (US)

(*) Notice: Subject to any disclaimer, the term of this patent is extended or adjusted under 35 U.S.C. 154(b) by 292 days.

(21) Appl. No.: 18/024,718

(22) PCT Filed: Sep. 2, 2021

(86) PCT No.: PCT/US2021/048913
§ 371 (c)(1),
(2) Date: Mar. 3, 2023

(87) PCT Pub. No.: WO2022/051535
PCT Pub. Date: Mar. 10, 2022

(65) Prior Publication Data
US 2023/0379045 A1    Nov. 23, 2023

Related U.S. Application Data

(60) Provisional application No. 63/075,026, filed on Sep. 4, 2020.

(51) Int. Cl.
*H04B 7/185* (2006.01)
*H01Q 1/28* (2006.01)
*H04B 7/06* (2006.01)

(52) U.S. Cl.
CPC ......... *H04B 7/18513* (2013.01); *H01Q 1/288* (2013.01); *H04B 7/0617* (2013.01)

(58) Field of Classification Search
CPC .. H04B 7/18513; H04B 7/0617; H04B 7/086; H04B 7/088; H04B 7/0695; H04B 7/18519; H04B 7/18545; H01Q 1/288
See application file for complete search history.

(56) References Cited

U.S. PATENT DOCUMENTS

| | | | |
|---|---|---|---|
| 8,923,756 B1* | 12/2014 | Freedman | H04B 7/2041 455/12.1 |
| 9,912,399 B2* | 3/2018 | Dankberg | H04B 7/18513 |

(Continued)

FOREIGN PATENT DOCUMENTS

| | | |
|---|---|---|
| EP | 2751935 A2 | 7/2014 |
| EP | 3016428 A1 | 5/2016 |

(Continued)

OTHER PUBLICATIONS

International Search and Written Opinion, PCT/US2021/048913 Dated Dec. 10, 2021, 11 pages.

*Primary Examiner* — Dhaval V Patel
(74) *Attorney, Agent, or Firm* — Holland & Hart LLP

(57) ABSTRACT

Methods, systems, and devices communications are described. A terminal may be identified with a geographic region. First beam coefficients may be determined for an antenna array having interelement spacing of antennas that is different across the antenna array. The first beam coefficients may be used to form a first beam for the terminal, where a coverage area of the first beam may encompass the geographic region. The first beam may be used to communicate with the terminal. Based on a utilization of the first beam exceeding a threshold, second beam coefficients may be determined for the antenna array. The second beam coefficients may be used to form a second beam, where a coverage area of the second beam may be different than the coverage area of the first beam. The second beam may be used to communicate with the terminal.

30 Claims, 9 Drawing Sheets

(56) References Cited

U.S. PATENT DOCUMENTS

| | | | | |
|---|---|---|---|---|
| 10,111,109 B2 * | 10/2018 | Hreha | ............... | H04B 7/043 |
| 10,903,898 B1 * | 1/2021 | Roy | ............... | H04B 7/18528 |
| 11,784,708 B2 * | 10/2023 | Fujii | ............... | H04B 7/18504 |
| | | | | 375/262 |
| 2008/0045146 A1 * | 2/2008 | Wahlberg | ......... | H04B 7/18573 |
| | | | | 455/12.1 |
| 2009/0286467 A1 * | 11/2009 | Miller | ............. | H04B 7/2041 |
| | | | | 455/3.02 |
| 2015/0263802 A1 | 9/2015 | Dankberg et al. | | |
| 2020/0007227 A1 | 1/2020 | Becker et al. | | |
| 2020/0212996 A1 * | 7/2020 | Liddell | ............ | H04B 7/18513 |
| 2020/0343970 A1 * | 10/2020 | Kim | ............... | H04B 7/2048 |

FOREIGN PATENT DOCUMENTS

| | | | |
|---|---|---|---|
| JP | 2016533108 A | 10/2016 | |
| JP | 2019036773 A | 3/2019 | |
| JP | 2019102998 A | 6/2019 | |
| RU | 2714928 C1 | 2/2020 | |
| WO | 2013032188 A2 | 3/2013 | |
| WO | 2013032188 A3 | 3/2013 | |
| WO | WO2019174745 A1 | 9/2019 | |
| WO | 2020167897 | 8/2020 | |

\* cited by examiner

BEAM MANAGEMENT USING SPARSE ANTENNA ARRAYS

CROSS REFERENCE

The present Application is a 371 national phase filing of International Patent Application No. PCT/US2021/048913 by Greinke et al. entitled, "Beam Management Using Sparse Antenna Arrays", filed Sep. 2, 2021, and to U.S. Provisional Patent Application No. 63/075,026 by Greinke, et al., entitled "Beam Management Using Sparse Antenna Arrays" filed Sep. 4, 2020, each of which is assigned to the assignee hereof and each of which is hereby incorporated by reference in its entirety.

BACKGROUND

The following relates generally to communications, including beamforming using sparse antenna arrays.

Communications devices may communicate with one another using wired connections, wireless (e.g., radio frequency (RF)) connections, or both. Wireless communications between devices may be performed using wireless spectrum that has been designated for a service provider, wireless technology, or both. In some examples, the amount of information that can be communicated via a wireless communications network is based on an amount of wireless spectrum designated to the service provider, and an amount of frequency reuse within the region in which service is provided. Wireless communications (e.g., cellular communications, satellite communications, etc.) may use beamforming and multiple-input multiple-output (MIMO) techniques for communications between devices to increase frequency reuse, however, providing a high level of frequency reuse in some types of communication systems such as satellite communications presents challenges.

SUMMARY

A terminal may be identified with a geographic region. First beam coefficients may be determined for an antenna array having interelement spacing of antennas that is different across the antenna array. The first beam coefficients may be used to form a first beam for the terminal, where a coverage area of the first beam may encompass the geographic region. The first beam may be used to communicate with the terminal. Based on a utilization of the first beam exceeding a threshold, second beam coefficients may be determined for the antenna array. The second beam coefficients may be used to form a second beam, where a coverage area of the second beam may be different than the coverage area of the first beam. The second beam may be used to communicate with the terminal.

DETAILED DESCRIPTION

A communications system (e.g., a satellite system) may communicate with terminals using wide communication beams (e.g., having coverage areas that span tens of kilometers), narrow communication beams (e.g., having coverage areas that span less than five kilometers), or a combination thereof. In some examples, enhanced techniques (e.g., geometric interpretation, geometrically-informed MIMO, etc.) may be used to form the narrow communication beams. The narrow communication beams may be formed within wide communication beams and may be used to increase a capacity of the communications systems, to increase a signal quality for a terminal, or a combination thereof.

Techniques for supporting using both wide communication beams and narrow communication beams to perform communicate may be established. In some examples, techniques for determining when to activate one or more narrow communication beams may be established—e.g., based on a utilization of a wide communication beam exceeding a threshold. Also, techniques for repositioning (e.g., centering) a beam coverage area of a narrow communication beam to increase (e.g., maximize) a quality of signals transmitted by a terminal using the narrow communication beam may be established, as well as techniques for maintaining (e.g., by moving) the beam coverage area of the narrow communication beam in a preferred position as the terminal moves. Additionally, techniques for forming additional narrow communication beams to service terminals that are left by a moving beam coverage area of a narrow communication beam may be established.

Figure 1:
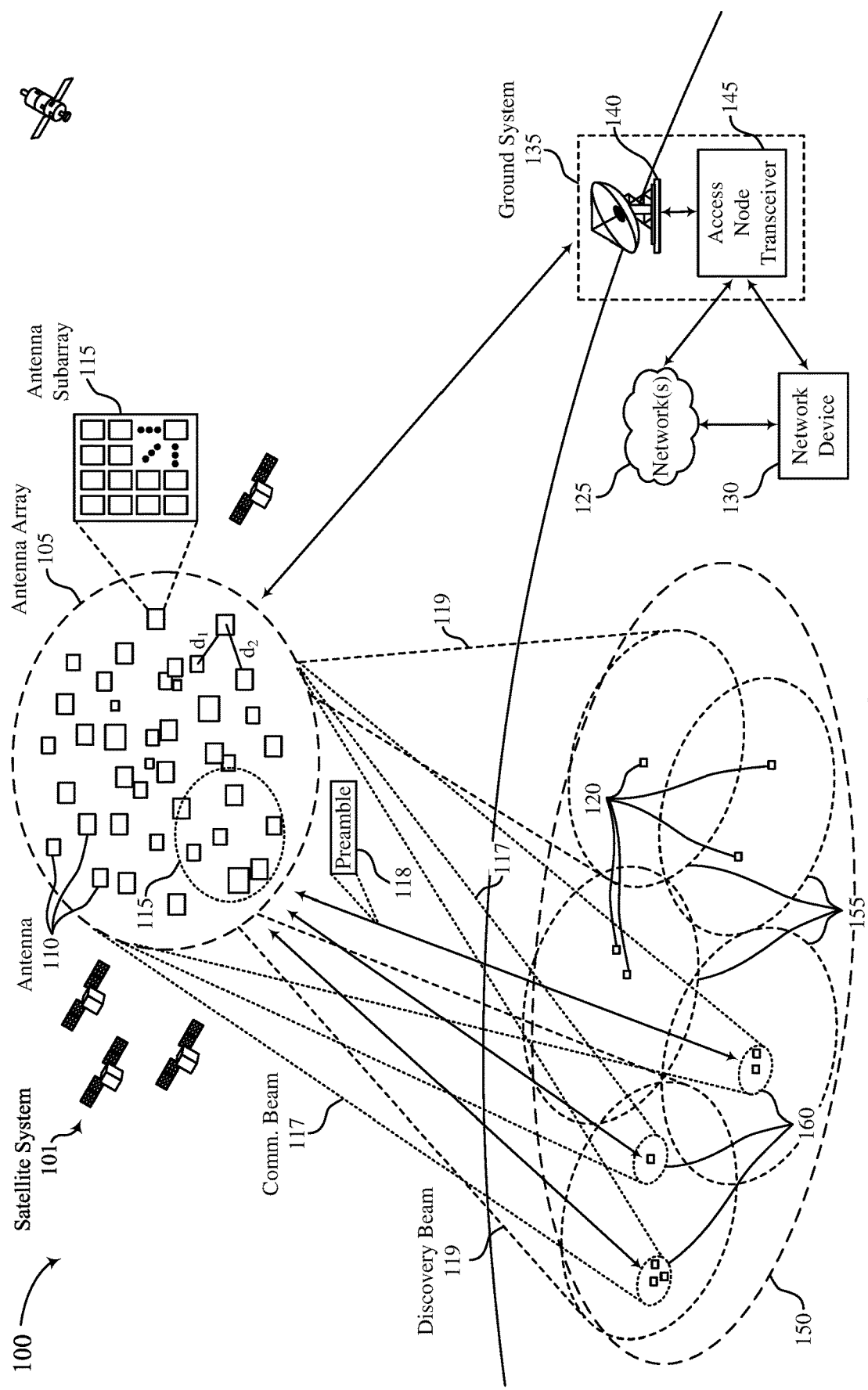
FIG. 1 shows an example of a satellite communications system that supports beam management using sparse antenna arrays in accordance with examples described herein.

FIG. 1 shows an example of a satellite communications system 100 that supports beam management using sparse antenna arrays in accordance with examples described herein. Satellite communications system 100 may include a ground system 135, terminals 120, and satellite system 101. The ground system 135 may include a network of access nodes 140 that are configured to communicate with the satellite system 101. The access nodes 140 may be coupled with access node transceivers 145 that are configured to process signals received from and to be transmitted through corresponding access node(s) 140. The access node transceivers 145 may also be configured to interface with a network 125 (e.g., the Internet)—e.g., via a network device 130 (e.g., a network operations center, satellite and gateway terminal command centers, or other central processing centers or devices) that may provide an interface for communicating with the network 125.

Terminals 120 may include various devices configured to communicate signals with the satellite system 101, which may include fixed terminals (e.g., ground-based stationary terminals) or mobile terminals such as terminals on boats, aircraft, ground-based vehicles, and the like. A terminal 120 may communicate data and information with an access node 140 via the satellite system 101. The data and information may be communicated with a destination device such as a network device 130, or some other device or distributed server associated with a network 125.

The satellite system 101 may include a single satellite, or a network of satellites that are deployed in space orbits (e.g., low earth orbits, medium earth orbits, geostationary orbits, etc.). One or more satellites included in satellite system 101 may be equipped with multiple antennas (e.g., one or more antenna arrays). In some examples, the one or more satellites equipped with multiple antennas may each include one or more antenna panels that include an array of evenly distributed antennas (which may also be referred to as antenna elements). In some examples, a satellite may be equipped with an antenna array including antennas that are unevenly distributed across a large region. In some examples, the antennas may be connected to a central entity via wired or wireless links. Deploying the antennas over the large region may increase an aperture size of the antenna array of the satellite relative to an antenna array that includes evenly distributed antennas (e.g., due to limitations associated with manufacturing and deploying a large antenna array with evenly distributed antennas). In some examples, a set of satellites, each including an antenna, are unevenly distributed across the large region, where each satellite may communicate with a central entity (e.g., a central server or ground station). In such cases, the antennas of the set of satellites may be used to form an antenna array. In some examples, a set of satellites, each including an antenna subarray, are unevenly distributed across the large region, where each satellite may communicate with a central entity (e.g., a central server or ground station) and where the antenna subarrays may include an array of evenly distributed antennas. In such cases, the antenna subarrays of the set of satellites may be used to form an antenna array.

The satellite system 101 may use the one or more satellites to support multiple-input multiple-output (MIMO) techniques to increase a utilization of frequency resources used for communications—e.g., by enabling wireless spectrum to be reused, in time and frequency, in different geographic regions of a geographic area. Similarly, the satellite system 101 may use the one or more satellites to support beamforming techniques to increase a utilization of frequency resources used for communications.

MIMO techniques may be used to exploit multipath signal propagation and increase spectral efficiency by transmitting or receiving multiple signals via different spatial layers. The multiple signals may, for example, be transmitted by a transmitting device (e.g., a satellite system) via a set of antennas in accordance with a set of weighting coefficients. Likewise, the multiple signals may be received by a receiving device (e.g., a satellite system) via a set of antennas in accordance with a set of weighting coefficients. Each of the multiple signals may be associated with a separate spatial stream and may carry bits associated with the same data stream (e.g., the same codeword) or different data streams (e.g., different codewords). MIMO techniques include single-user MIMO (SU-MIMO), where multiple spatial layers are used to communicate with one device, and multiple-user MIMO (MU-MIMO), where multiple spatial layers are used to communicate with multiple devices.

To determine weighting coefficients to apply to the set of antennas such that the N spatial layers are formed, an (M×N) MIMO matrix may be formed, where M may represent the quantity of antennas of the set of antennas. In some examples, M may be equal to N. The MIMO matrix may be determined based on a channel matrix and used to isolate the different spatial layers of the channel. In some examples, the weighting coefficients are selected to emphasize signals transmitted using the different spatial layers while reducing interference of signals transmitted in the other spatial layers. Accordingly, processing signals received at each antenna with the set of antennas (e.g., a signal received at the set of antennas) using the MIMO matrix may result in multiple signals being output, where each of the multiple signals may correspond to one of the spatial layers. The elements of the MIMO matrix used to form the spatial layers of the channel may be determined based on channel sounding probes received at a satellite system 101—e.g., from one or more devices. In some examples, the weighting coefficients used for MIMO communications may be referred to as beam coefficients, and the multiple signals or spatial layers may be referred to as beam signals.

Beamforming techniques may be used to shape or steer a communication beam along a spatial path between a satellite system 101 and a geographic area. A communication beam may be formed by determining weighting coefficients for antenna elements of antenna array that result in the signals transmitted from or received at the antenna elements being combined such that signals propagating in a particular orientation with respect to an antenna array experience constructive interference while others experience destructive interference. Thus, beamforming may be used to transmit signals having energy that is focused in a direction of a communication beam and to receive signals that arrive in a direction of the communication with increased signal power (relative to the absence of beamforming). The weighting coefficients may be used to apply amplitude offsets, phase offsets, or both to signals carried via the antennas. In some examples, the weighting coefficients applied to the antennas may be used to form multiple beams associated with multiple directions, where the multiple beams may be used to communicate multiple signals having the same frequency at the same time. The weighting coefficients used for beamforming may be referred to as beam coefficients, and the multiple signals may be referred to as beam signals.

In some examples, beamforming techniques may be used by a satellite system 101 to form spot beams that are tiled (e.g., tessellated) across a geographic area. In some examples, the wireless spectrum used by a satellite system 101 may be reused across sets of the spot beams for communications between terminals 120 and the satellite system. In some examples, the wireless spectrum can be reused in spot beams that do not overlap, where a contiguous geographic region can be covered by overlapping spot beams that each use orthogonal resources (e.g., orthogonal time, frequency, or polarization resources).

To support an increased quantity of users within a geographic area, an antenna array (which may be referred to as a large, sparse antenna array) having antennas with inter-element spacing that is different across the antenna array may be used to increase a resolution of beamforming techniques. That is, the large, sparse antenna array may be used (e.g., in combination with respective beam coefficients) to form communication beams with small coverage areas (e.g., less than 10 kilometers in diameter). A large, sparse antenna array, such as antenna array 105, may include multiple antennas 110 (e.g., hundreds or thousands of antennas) that are unevenly distributed across an area—e.g., in space. In some examples, each antenna 110 is, or is installed on, an individual satellite. In other examples, the antennas 110 are installed on a single satellite, where each antenna 110 is tethered to a central location e.g., via a physical connection.

Additionally, the distance between the antennas 110 may be greater than a distance associated with a wavelength of signals supported for communication by the large, sparse antenna array—e.g., the distance between the antennas 110 may be greater than a distance associated with the wavelength. In some examples, the distance between the antennas 110 may be greater than ten times the wavelength. In some examples, a first distance ($d_1$) between a first antenna of the antennas 110 and a second antenna of the antennas 110 may be different than a second distance ($d_2$) between the second antenna and a third antenna of the antennas 110, and so on throughout antenna array 105. In some examples, a large, sparse antenna array includes multiple antenna subarrays 115 (e.g., tens or hundreds of antenna subarrays) that are unevenly distributed across the area. In some examples, the antenna subarrays may each include a group of the antennas 110. In some examples, the antenna subarrays 115 may each include antennas 110 (which may also be referred to as antenna elements) that are evenly distributed across a corresponding antenna subarray 115. In some examples, in addition to being large and sparse, the antenna array 105 may be random or semi-random such that the distances between the antennas 110 of the antenna array 105 may be uncontrolled or partially controlled (e.g., unconstrained in one or more dimensions, or allowed to drift in one or more dimensions relative to other antennas 110).

To form the small communication beams, geometric relationships between a geographic region and the antennas 110 of the large, sparse antenna array 105 may be used. In some examples, the geometric relationships between a geographic region and the antennas 110 of the large, sparse antenna array 105 may also be used to simplify the processing used for massive-MIMO techniques—e.g., based on the limited directions of signal incidence, location information known for the terminals, or any combination thereof.

In some examples, to support communicating using communication beams 117 with small coverage areas, a large, sparse antenna array 105 may be used (e.g., in combination with respective beam coefficients) to form discovery beams 119 within a geographic area 150, where each discovery beam 119 may be formed by a corresponding set of antennas 110 of the antenna array 105 and may cover a discovery area 155 within the geographic area 150. For example, each antenna subarray 115 may form a discovery beam 119, and the discovery beams may be tiled across the geographic area 150. Preambles 118 transmitted from terminals 120 within a discovery area 155 of a discovery beam 119 may be detected using the large, sparse antenna array 105 (e.g., each antenna subarray 115 may detect preambles 118 transmitted from within a corresponding discovery area 155). Based on detecting a preamble 118 using a discovery beam 119, a presence of a terminal 120 in a discovery area 155 of the discovery beam 119 may be determined.

In some examples, based on detecting the presence of the terminal 120 within a discovery area 155, one or more antennas 110 (e.g., an antenna subarray 115 or a group of antennas 110) may be selected to perform communications with the terminal 120. In some cases, the set of antennas 110 and a corresponding set of beamforming coefficients are used to form a wide communication beam that has a wide coverage area including a position of the terminal 120. In some examples, a size of the wide coverage area may be similar to a size of a discovery area 155.

In some examples, based on detecting the presence of the terminal 120, a second set of antennas 110 (e.g., antennas from more than one antenna subarray 115, a substantial portion of antennas 110, a majority of antennas 110, or all of the antennas 110) of the antenna array 105 and corresponding beam coefficients may be selected to form a communication beam 117 (e.g., a small or narrow beam) having a beam coverage area 160 within the discovery area 155 that includes a position of the terminal 120. The second set of antennas may include a larger quantity of antennas than the one or more antennas used to form the wide communication beam. Subsequently, signals detected at the antenna array 105 may be processed according to the beam coefficients used to form the narrow communication beam 117, resulting in a beam signal for the narrow communication beam 117. In some examples, the beam signal may include one or more signals transmitted from one or more terminals positioned within the beam coverage area 160.

In some examples, antenna array 105 includes multiple antenna subarrays 115, where each antenna subarray 115 may be used to form a discovery beam 119 associated with a corresponding discovery area 155. Preambles from a set of terminals 120 may be detected using a subset of the discovery beams 119. Based on detecting the terminals using the subset of the discovery beams 119, communication beams 117 may be formed (e.g., using geometric interpretation or MIMO-based techniques) within the corresponding discovery areas 155, where beam coverage areas 160 of the communication beams 117 may encompass the detected terminals 120. Communications may be performed between the antenna array 105 and detected terminals 120 using the communication beams 117, where at least a subset of the communication beams 117 may reuse common time, frequency, and polarization resources.

In some examples, techniques for supporting communications using wide and narrow communication beams may be used. For example, techniques for determining when to use a wide communication beam, narrow communication beams 117, or a combination thereof, may be used. For instance, narrow communication beams 117 within a wide coverage area of a wide communication beam may be activated based on a utilization of the wide communication beam reaching a threshold (e.g., greater than 80% of the capacity of the wide communication beam). In some examples, techniques for adjusting a beam coverage area 160 of a narrow communication beam 117 to increase a quality of signals received from a terminal 120 that is used as a reference for the narrow communication beam 117 may be used. Also, techniques for maintaining the beam coverage area 160 of the narrow communication beam 117 focused on a position of the reference terminal 120 (which may be referred to as "beam tracking") may be used. Additionally, techniques for adjusting a size of beam coverage areas 160 of narrow communication beams 117 (or for forming additional narrow communication beam 117) to accommodate other terminals may be used.

Figure 2:
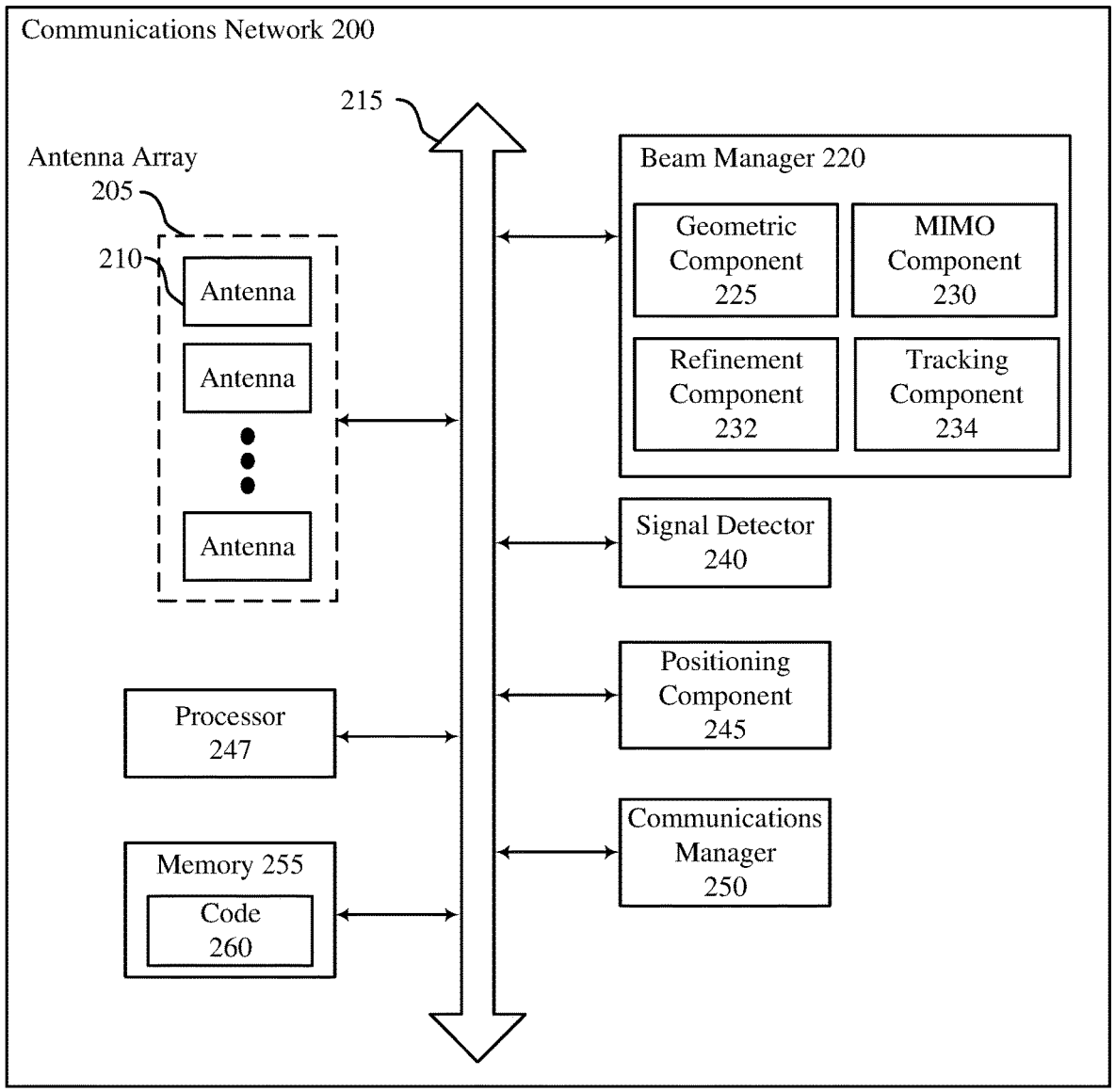
FIG. 2 shows an example of a communications network that supports beam management using sparse antenna arrays in accordance with examples described herein.

FIG. 2 shows an example of a communications network 200 that supports beam management using sparse antenna arrays in accordance with examples described herein.

Communications network 200 depicts a system for communicating using one or more of MIMO techniques, geometric interpretation techniques, and geometrically-informed MIMO techniques. Communications network 200 may include antenna array 205, bus 215, beam manager 220, signal detector 240, positioning component 245, processor 247, communications manager 250, and memory 255. At least a portion (e.g., all) of communications network 200 may be located within a space segment of communications network 200 (e.g., in a satellite system). In some examples, a portion of communications network 200 that is not included in the space segment may be located within a ground segment of communications network 200 (e.g., in a ground system). For example, antenna array 205, beam manager 220, signal detector 240, positioning component 245, processor 247, and memory 255 may be included in a space segment of communications network 200, while communications manager 250 may be included in a ground segment of communications network 200. In another example, antenna array 205 may be included in a space segment of communications network 200, while beam manager 220, signal detector 240, positioning component 245, processor 247, memory 255, and communications manager 250 may be included in a ground segment of communications network 200.

Antenna array 205 may be an example of the antenna array of FIG. 1 and may include antennas 210. The antennas 210 may be examples of the antennas 110 described with reference to FIG. 1. In some examples, one or more of the antennas 210 may be or include an antenna subarray, similar to the antenna subarray 115 described with reference to FIG. 1. The spacing between the antennas 210 may be different across antenna array 205. In some examples, a distance (e.g., an average distance) between the antennas 210 is greater than a distance associated with a wavelength of signals communicated using antenna array 205. In some examples, a distance (e.g., an average distance) between the antennas 210 is greater than a distance associated with ten times the wavelength of the signals communicated using antenna array 205.

Bus 215 may represent an interface over which signals may be exchanged between antenna array 205 and a central location that may be used to distribute the signal to the signal processing components of communications network 200 (e.g., beam manager 220, signal, signal detector 240, and positioning component 245. Bus 215 may include a collection of wires that connect to each of the antennas. Additionally, or alternatively, bus 215 may be a wireless interface that is used to wirelessly communicate signaling between antenna array 205 and the signal processing components—e.g., in accordance with a communication protocol.

Beam manager 220 may be configured to form beams, including discovery beams, communication beams, geometric interpretation-based beams, MIMO-based beams, and the like. In some examples, beam manager 220 may be configured to form one or more discovery beams (e.g., the discovery beams that cover the discovery areas 155 of FIG. 1) within a geographic area (e.g., geographic area 150 of FIG. 1) that is covered by the antenna array 205. To form the discovery beams, native antenna patterns of sets of the antennas 210 may be used, or may be combined with beamforming techniques, MIMO techniques, or a combination thereof.

Beam manager 220 may also be configured to form one or more communication beams (e.g., the communication beams that form the beam coverage areas 160 of FIG. 1). To form the communication beams, geometric interpretation-based beamforming techniques, MIMO techniques, or geometrically-informed MIMO techniques may be used. Beam manager 220 may include geometric component 225, MIMO component 230, refinement component 232, and tracking component 234.

Geometric component 225 may be configured to use a geometric relationship between a position of a terminal and a set (e.g., up to and including all) of the antennas 210 of antenna array 205 to form small communication beams (e.g., communication beams that have a diameter that is less than ten (10) km, or less than five (5) km). In some examples, geometric component 225 may determine beam coefficients (e.g., phase shifts, amplitude components) that may be used to align in time signals detected at different antennas 210 so that the signals may be summed together according to the spatial location of the terminal, increasing the signal strength of a transmitted signal associated with each of the detected signals. In some examples, geometric component 225 may determine a first set of beam coefficients associated with a first beam coverage area, a second set of beam coefficients associated with a second beam coverage area, and so on. Accordingly, geometric component 225 may independently determine and apply multiple sets of beam coefficients to signals received from antenna array 205, each set of beam coefficients associated with a different beam coverage area.

MIMO component 230 may be configured to use multipath signal propagation to form MIMO-based beams. In some examples, MIMO component 230 may receive channel sounding probes from a set of transmitters (e.g., terminals), where the structure of the channel sounding probes may be known to MIMO component 230 and where the channel sounding probes transmitted from different transmitters may be orthogonal to one another. MIMO component 230 may use the channel sounding probes to estimate the channel between antenna array 205 and the transmitters. Based on the estimated channel, MIMO component 230 may determine beam coefficients (e.g., amplitude and phase shifts) that may be used to reveal the spatial layers of the channel. In some examples, MIMO component 230 may determine beam coefficients that may be used to isolate signals transmitted over the spatial layers from one another—e.g., by, in each spatial layer, emphasizing the signals transmitted within the spatial layer and canceling interference from signals transmitted within other spatial layers. MIMO component 230 may determine a single set of beam coefficients that is applied to the signals detected at a set (e.g., all) of the antennas 210 at antenna array 205. The beam coefficients may be included in an M×N matrix, where a value of M may indicate the quantity of antennas 210 and a value of N may indicate the quantity of spatial layers, where the value of N may be less than or equal to the value of M.

Refinement component 232 may be configured to refine the positioning of beam coverage areas relative to reference terminals. For example, for a narrow communication beam, refinement component 232 may be configured to reposition the beam coverage area of the narrow communication beam to increase (e.g., maximize) a quality of signals received from a terminal for which the narrow communication beam was formed—e.g., by dithering the coverage area of the communication beam, sweeping the coverage area of the communication beam across a geographic region, etc.

Tracking component 234 may be configured to maintain the beam coverage areas over the terminals for which the corresponding narrow communication beams were formed. For example, for a narrow communication beam formed with reference to a terminal, tracking component 234 may be configured to move the beam coverage area with the movement of the terminal—e.g., keeping the terminal in a high-SNR area of the beam coverage area, such as the center of the beam coverage area.

Signal detector 240 may be configured to detect preambles transmitted from one or more terminals. In some examples, the preambles include repetitions of a waveform and are used to indicate the presence of a transmitting terminal. The preambles may also include positioning information (e.g., GPS coordinates). In some examples, the preamble is encoded and difficult to spoof—e.g., by using spreading codes, encrypted data, etc. In some examples, the preambles may be two-part preambles. For example, the preamble may include a first part used for detection of the preamble (e.g., the repetitions of the waveform) and a second part including the position information. In some examples, a first part of the preamble including the repetitions is transmitted first and the second part of the preamble including the positioning data is transmitted after a response from the communications network 200 acknowledging detection of the first part of the preamble is received.

Positioning component 245 may be configured to determine a position of one or more terminals that are detected within a geographic region—e.g., based on detecting the corresponding one or more preambles. In some examples, positioning component 245 determines the position of the one or more terminals based on positioning information received in the preamble. Additionally, or alternatively, positioning component 245 may determine the position of the one or more terminals based on dithering a beam coverage area of communication beam to determine a position of the beam coverage area that maximizes the signal quality for a terminal, where the terminal may be centered in the beam coverage area.

Positioning component 245 may be further configured to determine a position of the antennas 210. In some examples, positioning component 245 may determine the position of the antennas based on signals transmitted from transmitters at known geographic locations and geometric relationships between the transmitters and antenna array 205. In some examples, the transmitters may be located on the ground, in space, on a satellite including antenna array 205, on the antennas 210, or a combination thereof.

Communications manager 250 may be configured to process beam signals received from beam manager 220. Communications manager 250 may decode data symbols included in the beam signals. In some examples, communications manager 250 may configure different modes at beam manager 220. For example, communications manager 250 may configure a first mode at beam manager 220 that is used for discovering terminals in a geographic area. While the first mode is configured, beam manager 220 may use beamforming and/or MIMO techniques to form discovery areas. Communications manager 250 may also configure a second mode at beam manager 220 that is used for communication with terminals in the geographic area using small beams. While the second mode is configured, beam manager 220 may use geometric interpretation to form beam coverage areas for communicating with discovered terminals. In some examples, the first mode and the second mode may be simultaneously configured at beam manager 220. Thus, antenna array 205 may be used to simultaneously form discovery beams and communication beams. In the case where discovery beams and communication beams are formed concurrently, communication beams within a discovery beam may use different frequency, time, or polarization resources. Communications manager 250 may also configure a third mode at beam manager 220 that is used for communication with terminals in the geographic area using small beams. While the third mode is configured, beam manager 220 may use geometrically-informed MIMO to form beam coverage areas for communicating with discovered terminals. In some examples, the first mode and the third mode are configured simultaneously, and the second mode and the third mode are configured alternatively at beam manager 220.

In some examples, communications manager 250 may be configured to direct beam manager 220 to activate narrow communication beams to provide service to a geographic region. In some cases, the narrow communication beams may be used simultaneously with a wide communication beam to provide communication services to the geographic region. In other cases, the narrow communication beams may be used instead of the wide communication beam to provide communication services to the geographic region e.g., while a set of communication resources within the geographic region may be reserved for control signaling, such as preamble transmissions. In some examples, communications manager 250 may be configured to direct beam manager 220 to adjust a size of a narrow communication beam—e.g., to accommodate a terminal within a beam coverage area of the narrow communication beam.

Processor 247 may include an intelligent hardware device (e.g., a general-purpose processor, a digital signal processor (DSP), a central processing unit (CPU), a microcontroller, an application-specific integrated circuit (ASIC), a field programmable gate array (FPGA), a programmable logic device, a discrete gate or transistor logic component, a discrete hardware component, or any combination thereof). The processor 247 may be configured to execute computer-readable instructions stored in a memory (e.g., memory 255) to cause the communications network 200 to perform various functions (e.g., functions or tasks supporting beam management using sparse antenna arrays). For example, the communications network 200 or a component of the communications network 200 may include a processor 247 and memory 255 coupled to the processor 247 that are configured to perform various functions described herein.

The memory 255 may include random access memory (RAM) and/or read-only memory (ROM). The memory 255 may store code that is computer-readable and computer-executable. The code may include instructions that, when executed by the processor 247, cause the communications network 200 to perform various functions described herein. The code 260 may be stored in a non-transitory computer-readable medium such as system memory or another type of memory. In some cases, the code 260 may not be directly executable by the processor 247 but may cause a computer (e.g., when compiled and executed) to perform functions described herein. In some cases, the memory 255 may contain, among other things, a basic I/O system (BIOS) which may control basic hardware or software operation such as the interaction with peripheral components or devices.

In some examples, beam manager 220, signal detector 240, positioning component 245, communications manager 250, or various combinations or components thereof, may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, beam manager 220, signal detector 240, positioning component 245, communications manager 250, or various combinations or components thereof, may be implemented in code 260 (e.g., as communications management software or firmware), executed by processor 247. If implemented in code 260 executed by processor 247, the functions of beam manager 220, signal detector 240, positioning component 245, communications manager 250, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

Figure 3:
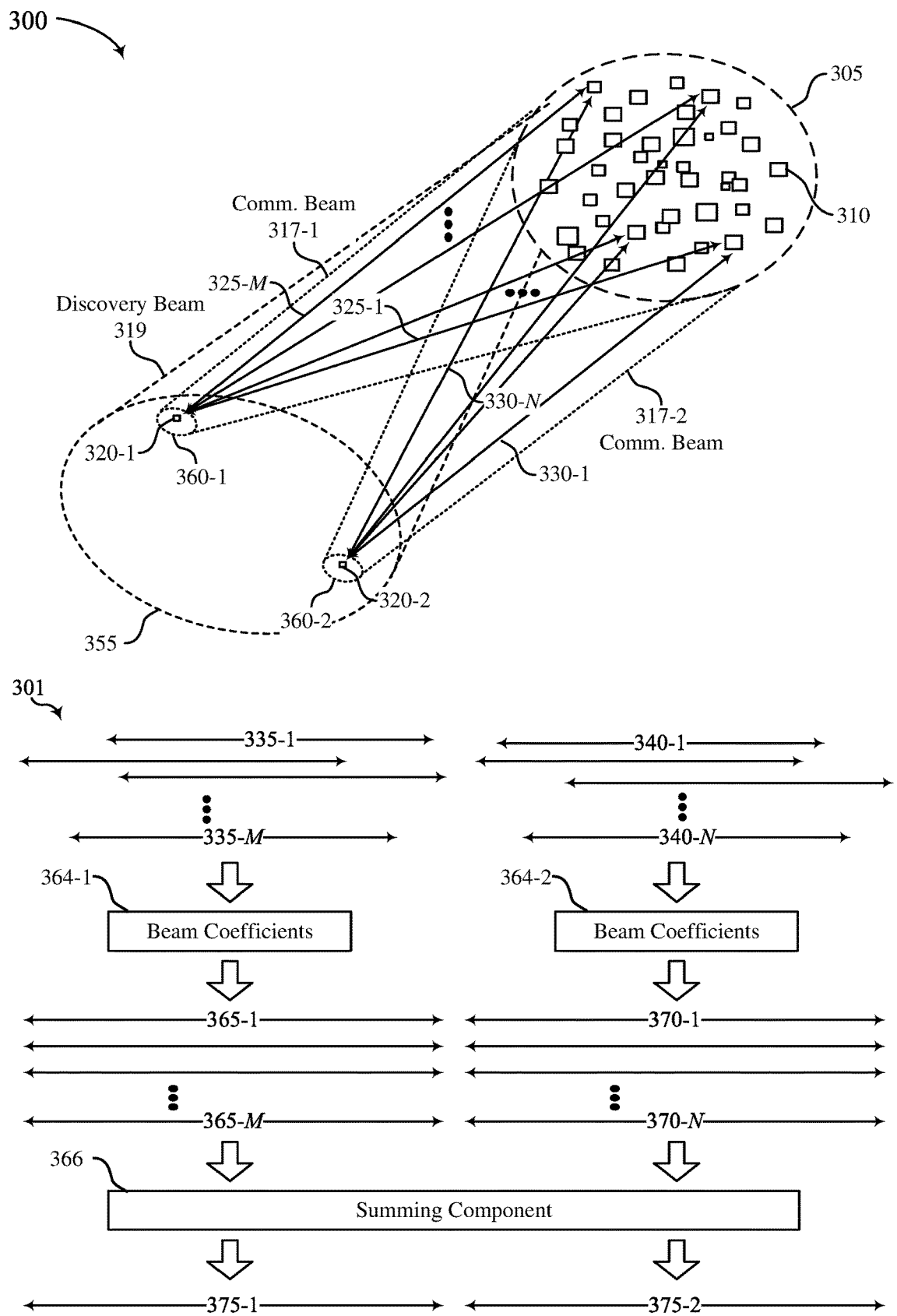
FIGS. 3 and 4 show examples of communications subsystems that support beam management using sparse antenna arrays in accordance with examples described herein.

FIG. 3 shows an example of a communications subsystem 300 that supports beam management using sparse antenna arrays in accordance with examples described herein. Communications subsystem 300 depicts communications between antenna array 305 and terminals 320 that are processed using geometric relationships between the antennas 310 of antenna array 305 and the terminals 320. In some examples, a first set of signals 325 are transmitted between first terminal 320-1 and antenna array 305, and a second set of signals 330 are transmitted between second terminal 320-2 and antenna array 305. In some examples, the first set of signals 325 may be associated with a single signal (e.g., a preamble or data signal) transmitted from first terminal 320-1 to antenna array 305, where the first set of signals 325 may be components (e.g., multipath components) of the signal transmitted from first terminal 320-1. In other examples, the first set of signals 325 may be associated with a single signal (e.g., a preamble response or data signal) obtained at antenna array 305 for transmission to first terminal 320-1, where the first set of signals 325 may be components (e.g., elements) of the signal transmitted from antenna array 305. Similarly, the second set of signals 330 may be associated with a single signal (e.g., a preamble or data signal) transmitted from second terminal 320-2 to antenna array 305 or a single signal (e.g., a preamble response or data signal) obtained at antenna array 305 for transmission to second terminal 320-2.

In some examples, a first set of the antennas 310 and first beam coefficients are used to form discovery beam 319 having discovery area 355. Signals received at antenna array 305 using the first set of the antennas 310 and the first beam coefficients may be analyzed to determine whether a preamble indicating the presence of a terminal is included in the signals. In some examples, the presence of first terminal 320-1 is detected based on first terminal 320-1 transmitting a preamble, where the first set of signals 325 may be signal components of the preamble transmission. The preamble may include a repeating waveform. In some examples, the waveform may be modulated with a spreading code before transmission or may include encoded data to increase a difficulty associated with spoofing the preamble. The preamble may also include positioning information—e.g., in a second part of the preamble.

In some examples, a position of first terminal 320-1 may be determined based on positioning information included in the preamble. Additionally, or alternatively, the position of first terminal 320-1 may be determined based on dithering a beam coverage area around discovery area 355 after detecting the presence of first terminal 320-1. The position of first terminal 320-1 may be determined based on a signal quality associated with first beam coverage area 360-1 satisfying a threshold, being higher than signal qualities associated with other beam coverage areas covered by the dithering operation, or both. The presence and position of second terminal 320-2 may similarly be detected based on a preamble transmitted from second terminal 320-2, where the second set of signals 330 may be signal components of the preamble transmission.

Second beam coefficients may be determined for first terminal 320-1 based on the position of first terminal 320-1. The second beam coefficients may also be determined based on a position of the antennas 310 relative to first terminal 320-1. The second beam coefficients, along with a second set of the antennas 310, may be used in the formation of first communication beam 317-1 having first beam coverage area 360-1. The second beam coefficients may be used to apply timing shifts (e.g., phase shifts) or amplitude weighting to signals detected at different antennas of the second set of the antennas 310, such that signals transmitted within first beam coverage area 360-1 are distinguishable from signals transmitted within adjacent beam coverage areas. In some examples, the second beam coefficients may be represented using an $M_1 \times 1$ vector, where $M_1$ may represent the quantity of antennas (e.g., 100 antennas, 1000 antennas, etc.) of the second set of the antennas 310. In some cases, the $M_1 \times 1$ vector may include coefficients for all of antennas 310, where some coefficients may be zero coefficients (e.g., the second set of antennas 310 that contribute to the first communication beam 317-1 may be a subset of the antennas 310).

Third beam coefficients may similarly be determined for second terminal 320-2. In some examples, the third beam coefficients may be represented using an $M_2 \times 1$ vector, where $M_2$ may represent the quantity of antennas (e.g., 100 antennas, 1000 antennas, etc.) of a third set of the antennas 310. In some examples, the third set of the antennas 310 and the second set of the antennas 310 are overlapping (e.g., partially or completely).

In some examples, the first set of the antennas 310 associated with discovery beam 319 may detect the first set of signals 325 within discovery area 360 and the second beam coefficients used to form first communication beam 317-1 may be determined. Based on the determining, the second beam coefficients may be applied to a subsequent set of detected signals (e.g., corresponding to a subsequent data signal transmitted by first terminal 320-1) that is output by the second set of the antennas 310 associated with first communication beam 317-1. In some examples, the second set of the antennas 310 includes most (e.g., greater than 50%, 60%, 70%, 80%, or 90%) of the antennas 310 at antenna array 305. In some cases, the second set of antennas 310 may include a portion (or all) of the first set of antennas 310 associated with discovery beam 319, where the second set of antennas 310 may include a larger quantity of the antennas 310 than the first set of antennas 310.

The first set of antennas 310 associated with discovery beam 319 may also detect the second set of signals 330 within discovery area 360 and the third beam coefficients used to form second communication beam 317-2 may be determined. Based on the determining, the third beam coefficients may be applied to a subsequent set of detected signals (corresponding to a subsequent data signal transmitted by second terminal 320-2) that is output by the third set of the antennas 310 associated with second communication beam 317-2. The third set of antennas 310 may be overlapping with the second set of antennas 310 e.g., may include a portion of or be the same as the second set of antennas 310. The second set of antennas 310 may also include most (e.g., greater than 50%, 60%, 70%, 80%, or 90% of the antennas 310 at antenna array 305.

Signal diagram 301 depicts a first set of element signals 335 detected at the second set of antennas 310 associated with first communication beam 317-1 and a second set of element signals 340 detected at the third set of antennas 310 associated with second communication beam 317-2. Signal diagram 301 also depicts time delays associated with when the first set of element signals 335 and second set of element signals 340 are detected at respective antennas. The first set of element signals 335 may correspond to the first set of signals 325, and the second set of element signals 340 may correspond to the second set of signals 330. In some examples, the first set of element signals 335 and the first set of signals 325 may be associated with a data signal transmitted from first terminal 320-1. And the second set of element signals 340 and the second set of signals 330 may be associated with a data signal transmitted from second terminal 320-2.

Signal diagram 301 also depicts a result of applying first beam coefficients 364-1 (which may correspond to the second beam coefficients used to form first communication beam 317-1) to the first set of element signals 335 to obtain resulting element signals 365. In some examples, each beam coefficient of first beam coefficients 364-1 may be applied to a respective antenna of the second set of the antennas 310. Each beam coefficient of first beam coefficients 364-1 may be used to apply a time delay (e.g., a phase shift) or an amplitude weight, or both, to a signal received at a respective antenna element such that the resulting element signals 365 are aligned in time and can be combined (e.g., summed via summing component 366) with one another to form first beam signal 375-1 for first communication beam 317-1, where an SNR value of first beam signal 375-1 may be proportional to the quantity of element signals 365. In some examples, summing component 366 may include separate summing components that are used to sum the element signals obtained for respective communication beams.

Second beam coefficients 364-2 (which may correspond to the third beam coefficients used to form second communication beam 317-2) may similarly be applied to the second set of element signals 340 and the resulting element signals 370 may be combined (e.g., summed via summing component 366) to obtain second beam signal 375-2 for second communication beam 317-2. Accordingly, the beam coefficients used to form the communication beams 317 may be independently determined and applied to signals received at antennas 310.

In some examples, the transmission of the associated data signal from first terminal 320-1 and the associated data signal from second terminal 320-2 may overlap (e.g., partially or fully) with one another in time. In such cases, the first set of element signals 335 and the second set of element signals 340 may be superimposed, forming a composite signal. Also, in such cases, first beam coefficients 364-1 may be applied to the composite signals to obtain resulting element signals 365 and second beam coefficients 364-2 may be applied to the composite signal to obtain resulting element signals 370. In such cases, the undesired signals in the composite signals may result in noise in the resulting beam signal 375 and may approach being canceled for a large number of elements signals.

In some examples, the following equation may be used for determining beam signals received from multiple communication beams 317:

$$\text{CohSum}(t) = \sum_{i=1}^{N} A[\![i]\!] \text{Signal}[2\pi f_0(t-(t_{prop}[\![i]\!]|_{phySRF} - t_{prop}[\![i]\!]|_{EstSRF})) + \emptyset[(t-(t_{prop}[\![i]\!]|_{phySRF} - t_{prop}[\![i]\!]|_{EstSRF}))]],$$

where $A[\![i]\!]$ Signal corresponds to the signal received at the ith antenna of a set of antennas, $f_0$ is the frequency of the signal, t is the current time, $t_{prop}[\![i]\!]|_{phySRF}$ is the time at which the signal is received at the ith antenna, $t_{prop}[\![i]\!]|_{EstSRF}$ is a quantized estimate of the time delay between the signal received at the ith antenna and the earliest signal received at the set of antennas, and $\emptyset$ is the phase of the signal. The time delay between the signal recited at the ith antenna and the earliest signal received at the set of antennas represents the delay spread across the array at each ith antenna. Subtracting the individual delay may bring all signal samples into alignment—e.g., as if they were all co-located at the "earliest signal" arrival location.

Figure 4:
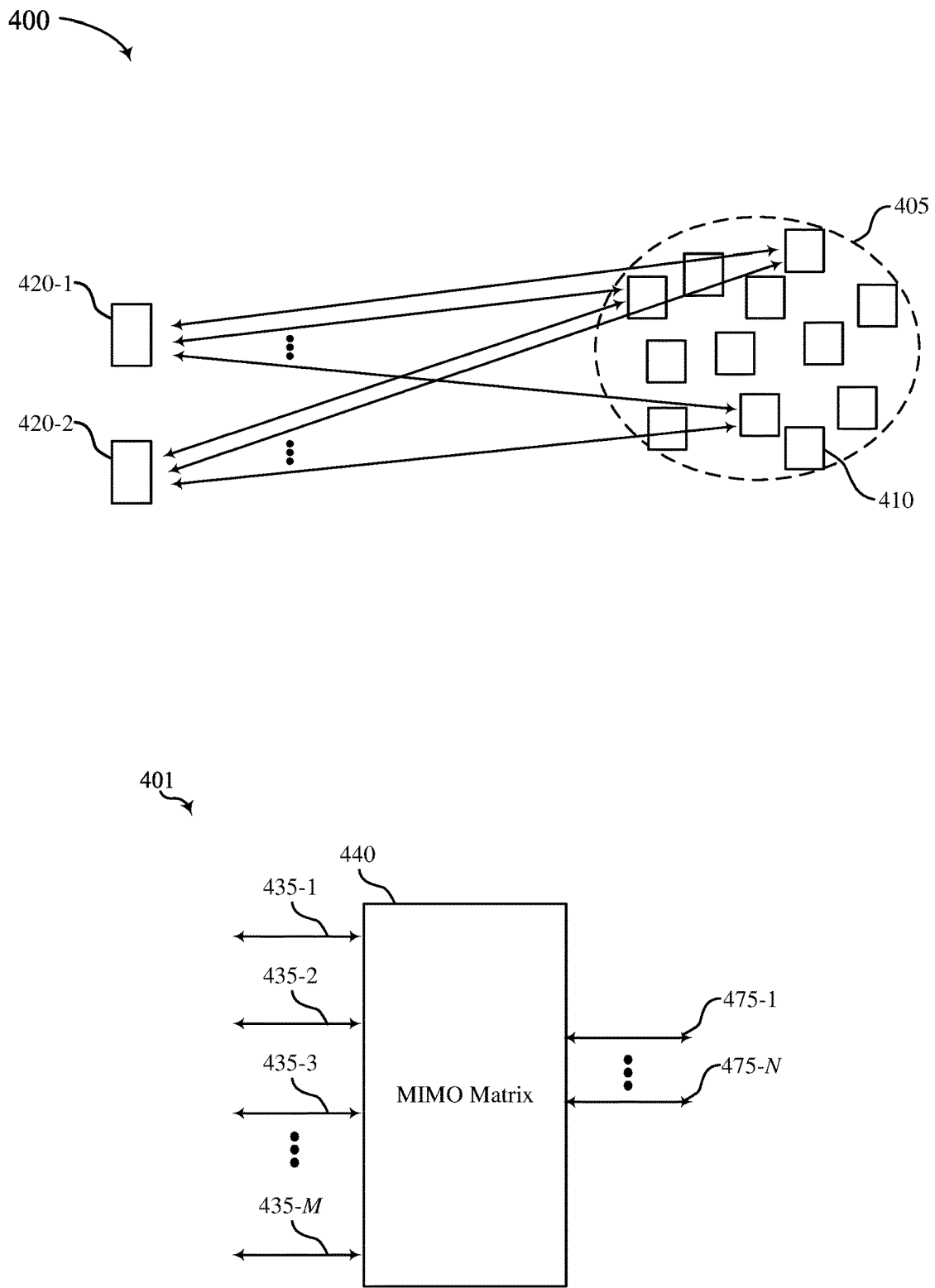

FIG. 4 shows an example of a communications subsystem 400 that supports beam management using sparse antenna arrays in accordance with examples described herein. Communications subsystem 400 depicts communications between antenna array 405 and terminals 420 that are processing using MIMO processing or geometrically-informed MIMO processing. In some examples, first terminal 420-1 is an example of first terminal 320-1 of FIG. 3, and second terminal 420-2 is an example of second terminal 320-2 of FIG. 3.

The communication paths between the terminals 420 and antenna array 405 may be referred to as a channel. The channel may be composed of multiple spatial layers, where the multiple antennas 410 of antenna array 405 (along with a set of beam coefficients) may be used to expose the spatial layers of the channel. In some examples, the set of beam coefficients (which may also be referred to as MIMO coefficients) are selected to expose a first spatial layer of the channel that encompasses first terminal 420-1 (which may also be referred to as a communication beam or MIMO beam) and a second spatial layer of the channel that encompasses second terminal 420-2.

In some examples, the beam coefficients are determined based on channel sounding probes transmitted from the terminals 420. The channel sounding probes may have signal patterns that are known to the communications network and that can be used to adapt the beam coefficients to ensure that the spatial layers are focused on respective terminals (or groups of terminals). The channel sounding probes may also be orthogonal to one another. Estimation techniques, such as maximum ratio combining (MRC), minimum mean square error (MMSE), zero forcing, successive interference cancellation, maximum likelihood estimation, or neural network MIMO detection techniques, may be used to estimate the channel between antenna array 405 and the terminals 420, as well as to determine the beam coefficients. Because the beam coefficients are formed using channel sounding probes received from multiple terminals, the resulting beam coefficients may be dependent on channel sounding probes transmitted in different spatial layers. That is, the beam coefficients may be determined to decrease interference from the channel sounding probes on each other and changes to one beam coefficient may result in changes to other beam coefficients. Accordingly, the beam coefficients may be included in a single MIMO matrix (e.g., a M×N matrix, where M may represent the quantity of antennas 410 and N may represent the quantity of spatial streams), where the elements of the matrix may be dependent on one another.

In some examples, operations for determining the beam coefficients use high levels of processing and are highly complex. The amount of processing and complexity may increase as the quantity of antennas increases and as the quantity of spatial streams increases. In some examples, geometric relationships between terminals 420 and antennas 410 may be used to simplify the operations for determining the beam coefficients—e.g., by constraining the channel matrix, reducing the set of possible beam coefficients, or both. In some examples, the channel sounding probes may experience less scattering based on the relative positions of the terminals 420 and antenna array 405. Accordingly, the channel estimated using the channel sounding probes may be constrained, which may reduce a complexity associated with determining the beam coefficients.

The geometric relationships between terminals 420 and antennas 410 may enable the set of possible beam coefficients to be reduced for one or more of the following reasons the position of the antennas in space may reduce the amount of scattering and multipath components that are taken into consideration in a terrestrial application; the position of the antennas in space may reduce the angles from which the signals transmitted from terminals 420 may arrive; the time delays at the different antennas 410 may be utilized to determine spatial information that facilitates determining the beam coefficients, etc.

Signal diagram 401 may depict a first set of element signals 435 received at antenna array 405, where each element signal 435 may be received at a respective antenna e.g., first element signal 435-1 may correspond to a first antenna of the antennas 410. Each element signal 435 may receive signal components related to signals transmitted from first terminal 420-1 and second terminal 420-2 (and, in some examples, from other terminals), including direct path and multipath signals.

MIMO matrix 440 may be applied to the element signals 435, where the elements of MIMO matrix 440 may be previously determined using channel sounding probes transmitted from a set of terminals. After MIMO matrix 440 is applied to element signals 435, a set of beam signals 475 may be output, where the beam signals 475 may be associated with respective spatial layers of the channel that are exposed by MIMO matrix 440.

Figure 5:
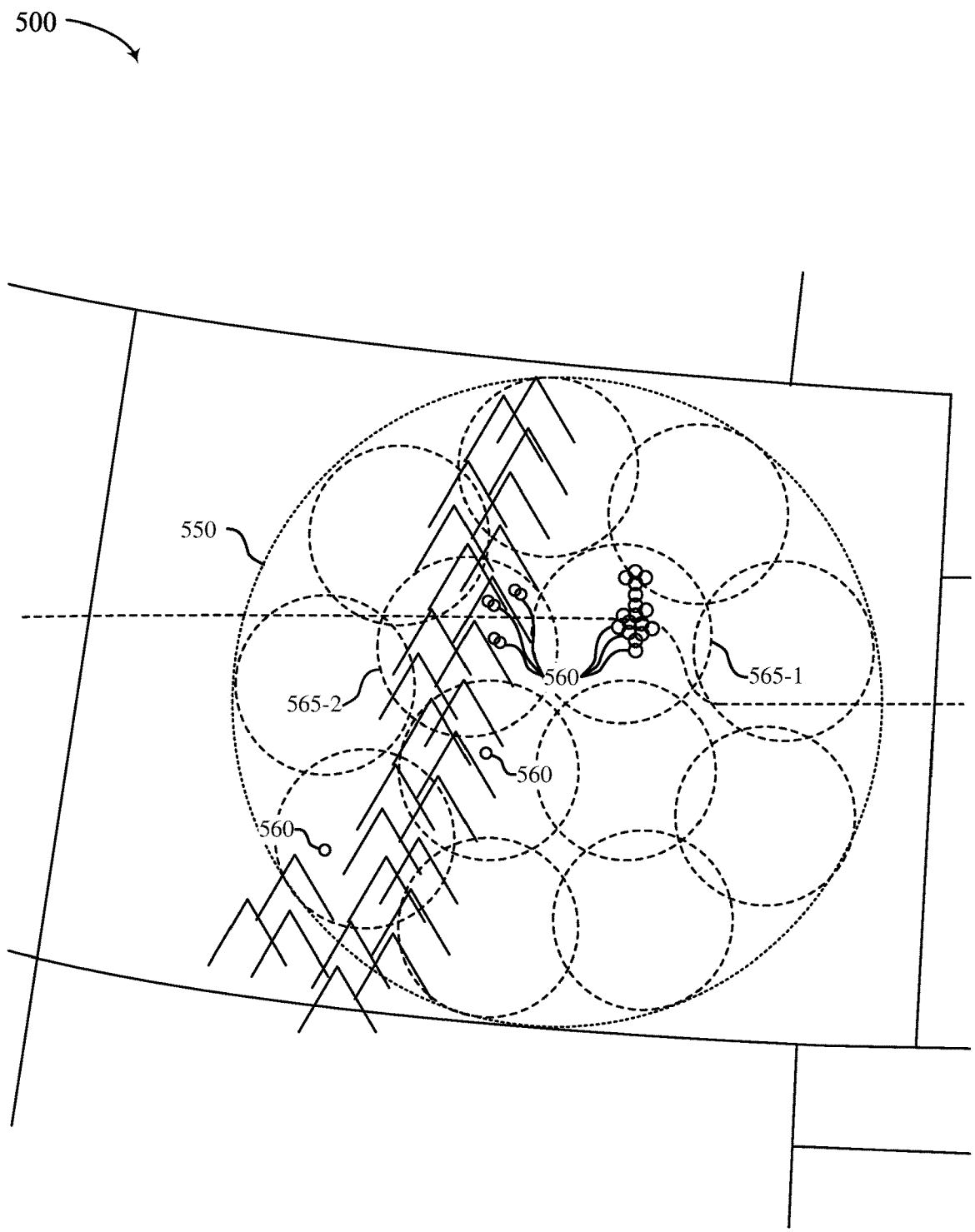
FIG. 5 shows an example coverage diagram for beam management using sparse antenna arrays in accordance with examples described herein.

FIG. 5 shows an example coverage diagram 500 for beam management using sparse antenna arrays in accordance with examples described herein. Coverage diagram 500 depicts a pattern of coverage areas formed by a set of beams, where the coverage areas include wide coverage areas 565 and beam coverage areas 560. The beam coverage areas 560 may be examples of beam coverage areas described with reference to FIGS. 1 and 3. In some examples, wide coverage areas 565 may have similar diameters as the discovery areas described with reference to FIGS. 1 and 3. Also, in some examples, wide coverage areas 565 may be used to receive discovery signals, such as preambles transmitted by a terminal to indicate a presence of the terminal.

In some examples, a communications network uses the wide coverage areas 565 to communicate with terminals within geographic area 550. Communications using the wide coverage areas 565 may use less power than communications using the beam coverage areas 560. While performing communications using a wide coverage area 565, the communications network may determine that a utilization of a wide communication beam used to form the wide coverage area 565 has exceeded a threshold (e.g., 80% or 90% of the capacity of the wide communication beam). Thus, the communications network may determine that the wide beam is (or may become) congested for providing communication services to the terminals within the corresponding wide coverage area 565.

In some examples, to increase the quantity of terminals or demand from the terminals that may be served within the corresponding wide coverage area 565, the communications network may form narrow communication beams that cover beam coverage areas 560 within the wide coverage areas 565. In some examples, the narrow communication beams may be formed so that corresponding beam coverage areas 560 cover a highly populated area (e.g., a city, metropolitan area, popular tourist or recreational areas, etc.). In some examples, the boundaries of the beam coverage areas 560 may be determined based on the position of one or more reference terminals and may change with time.

As depicted in FIG. 5, a set of narrow communication beams may be used to form a set of beam coverage areas 560—e.g., using geometric interpretation or geometrically-informed MIMO. The beam coverage areas 560 may be focused on a populated area within a wide coverage area 565. In some examples, communications may be simultaneously performed using the wide communication beams and the narrow communications beams. For example, the communications network may receive first signals using a wide communication beam corresponding to second wide coverage area 565-2 and second signals using the narrow communications beams used to form the beam coverage areas 560 within second wide coverage area 565-2. The first signals may be associated with transmitters positioned in rural areas while the second signals may be associated with transmitters positioned in more populated areas.

In some examples, positions of the beam coverage areas 560 may be fixed—e.g., beam coverage areas 560 covering high density areas. Beam coverage areas 560 that are fixed may be linked to a specific geographic area—e.g., relative to the boundaries of a county or city. In other cases, positions of one or more of the beam coverage areas 560 may be adjusted e.g., beam coverage areas 560 covering low density areas. Beam coverage areas 560 that are adjustable may be linked to a position of a particular terminal (which may be referred to as a reference terminal), and thus may move as the reference terminal moves. By contrast, beam coverage areas 560 that are fixed may be independent of the movement of terminals within their boundaries.

However, in some cases, communications using the narrow communication beams may excessively interfere with simultaneous communications using the wide communication beams. In some examples, communications using narrow communication beams interfere with communications using wide communication beams when a large quantity of narrow communication beams are formed within a wide coverage area, such as first wide coverage area 565-1. In some examples, communications using narrow communication beams interfere with communications using wide communication beams when a large quantity of the narrow communication beams overlap with one another—e.g., because more orthogonal communication resources (e.g., time, frequency, polarity) may be used to support the overlapping narrow communication beams, limiting the use of such communication resources for a wide communication beam.

In some examples, the communications network may use only the narrow communication beams when the narrow communication beams interfere with communications using the wide communication beams. In other examples, the communications network may reserve communication resources when the narrow communication beams interfere with communications using the wide communication beams such that communications may be performed in the wide communication beams using the reserved communication resources. In some examples, the reserved communication resources are designated for control signaling, such as preambles used to indicate a presence of a terminal within a wide coverage area 565.

Figure 6A:
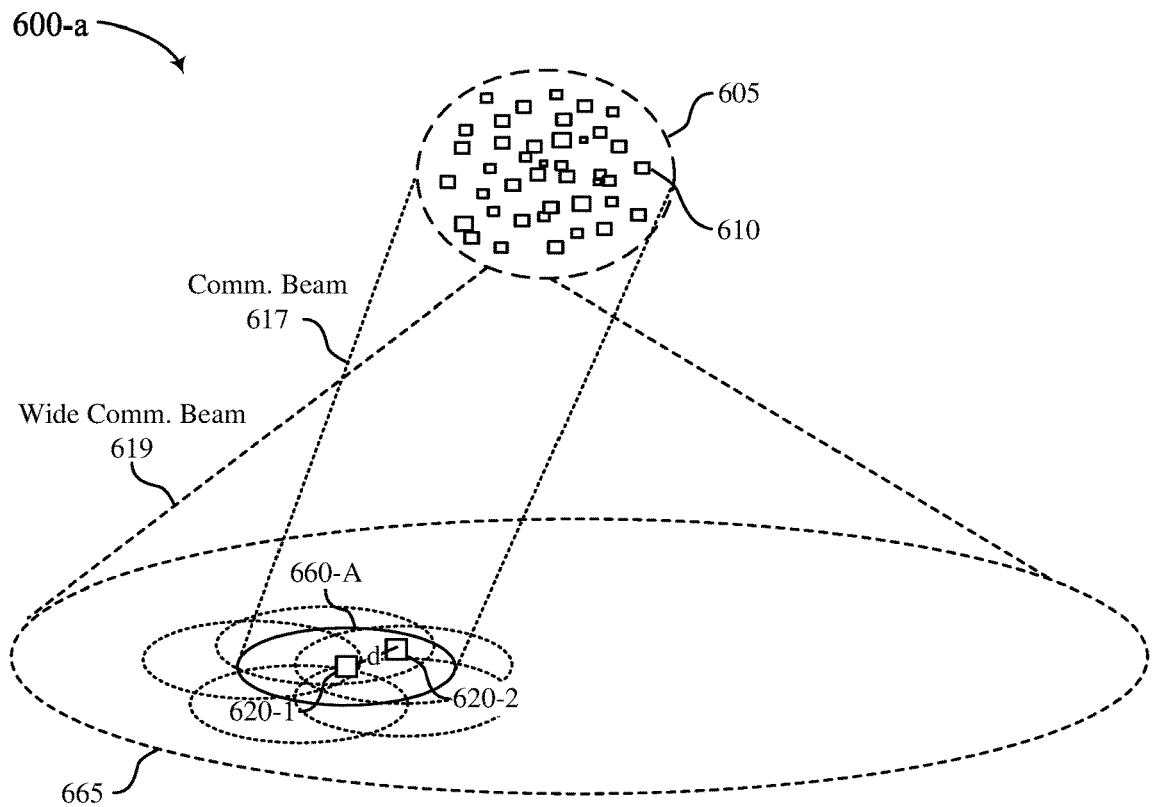
FIGS. 6A through 7B show examples of communications subsystems that support beam management using sparse antenna arrays in accordance with examples described herein.

FIG. 6A shows a communications subsystem that supports beam management using sparse antenna arrays in accordance with examples described herein.

Communications subsystem 600-*a* depicts communications between antenna array 605 and terminals 620 using narrow communication beams, where the narrow communication beams may be formed using geometric interpretation, geometrically-informed MIMO, or both. Communications subsystem 600-*a* also depicts techniques for positioning a coverage area of a communication beam to increase a quality of signals received from a terminal using the communication beam.

In some examples, a communications network may use antenna array 605 to form a wide communication beam 619 having wide coverage area 665 and a communication beam 617 having beam coverage area 660-*a*. Communication beam 617 may be an example of a communication beam as described with reference to FIGS. 1 and 3 and may have a beam coverage area as described with reference to FIGS. 1, 3, and 5. The wide communication beam 619 may be formed using MIMO or beamforming techniques and may be an example of a wide communication beam used to form a wide coverage area 565 as described with reference to FIG. 5. The communication beam 617 may be formed using geometric interpretation or geometrically-informed MIMO techniques and may be an example of a narrow communication beam used to form a beam coverage area 560 as described with reference to FIG. 5.

In some examples, the communications network may identify a presence of a terminal based on a received preamble, where the preamble may be received within the boundaries of a wide coverage area—e.g., via a discovery beam. In some examples, the communications network determines a position (e.g., a rough position) of the terminal based on the preamble transmission. In some examples, the communications network may further refine the determined position for the terminal by dithering a coverage area of a communication beam across a geographic region and identifying a coverage area that results in a highest quality (e.g., SNR, SINR, etc.) for signals received from the terminal.

For example, the communications network may receive a preamble from first terminal 620-1. Based on receiving the preamble, the communications network may use antenna array 605 to form communication beam 617. In some examples, the coverage area of the communication beam 617 encompasses first terminal 620-1—e.g., based on positioning information determined for first terminal 620-1 using the preamble. That said, in some cases, the determined positioning information provides a rough estimate of the position of first terminal 620-1. In such cases, a quality of the signals received from first terminal 620-1 may be increased by repositioning the coverage area of communication beam 617—e.g., the quality of signals transmitted from first terminal 620-1 via communication beam 617 may be increased when first terminal 620-1 is centered within a coverage area of communication beam 617.

To determine a preferred position over the coverage area of communication beam 617, the communications network may adjust the coverage area of communication beam 617 across a geographic region—e.g., by using different sets of beam coefficients for communication beam 617 corresponding to different coverage areas for communication beam 617. In some cases, the communication beam 617 may dither the coverage area of communication beam 617 around a determined position of first terminal 620-1. In other cases, the communications network may adjust the coverage area of communication beam across most (or all) of wide coverage area 665. In some examples, dithering or adjusting the coverage area of communication beam 617 includes covering a discrete quantity of coverage areas and measuring a quality of signals received from first terminal 620-1 in each of the coverage areas. In some examples, dithering or adjusting the coverage area of communication beam 617 may be performed on a same set of signals received at antenna array 605. That is, a communication beam signal may be generated based on applying a current set of beamforming coefficients to component signals from antenna array 605 for communication beam 617, and additional sets of beamforming coefficients may be applied to stored versions of the component signals from antenna array 605 to determine an updated set of beamforming coefficients (e.g., used for determining subsequent communication beams signals). In some examples, the communications network determines that the quality of the signals received from first terminal 620-1 is highest within beam coverage area 660-*a*. Accordingly, the communications network may configure the beam coefficients used to form communication beam 617 so that communication beam 617 covers beam coverage area 660-*a*.

In some examples, second terminal 620-2 may be positioned within beam coverage area 660-*a*. In such cases, the communications network may also communicate with second terminal 620-2 using communication beam 617—e.g., using different time or frequency resources than first terminal 620-1. Second terminal 620-2 may be separated from first terminal 620-1 by a distance, which may be referred to as d.

In some examples, the communications network may communicate with second terminal 620-2 using communication beam 617 based on identifying a position of second terminal 620-2 within beam coverage area 660-*a* rather than a different beam coverage area established within wide coverage area 665—e.g., based on a preamble received from second terminal 620-2. In some examples, after detecting second terminal 620-2, beam coverage area 660-*a* may be adjusted to increase (e.g., maximize) an average quality of signals received from both first terminal 620-1 and second terminal 620-2—e.g., based on centering the beam coverage area 660 over a common point between first terminal 620-1 and second terminal 620-2. In such cases, the quality of signals received from first terminal 620-1 may decrease while the quality of signals received from second terminal 620-2 may increase relative to a prior position of the beam coverage area 660 (e.g., the position of beam coverage area 660-*a*). In some examples, the communications network may similarly dither the position of beam coverage area 660 to identify a preferred positioning of beam coverage area 660 that achieves a threshold signal quality from both first terminal 620-1 and second terminal 620-2.

Figure 6B:
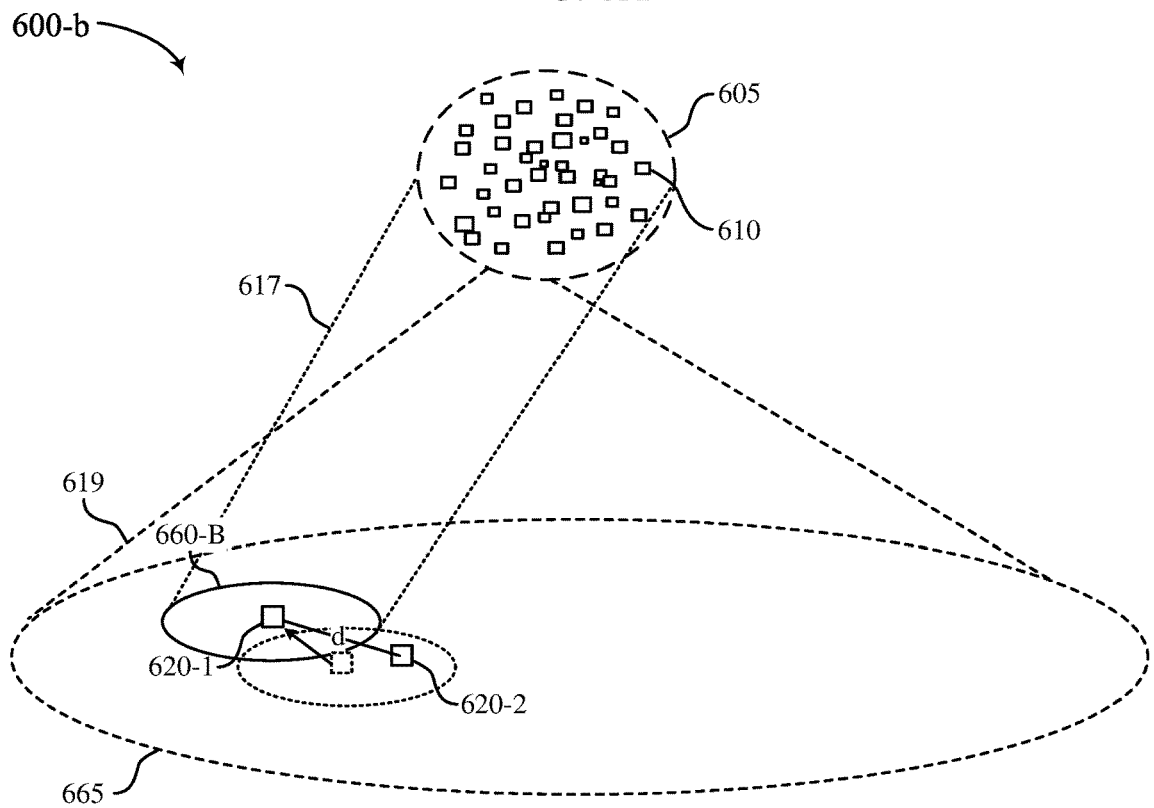

FIG. 6B shows a communications subsystem that supports beam management using sparse antenna arrays in accordance with examples described herein.

Communications subsystem 600-*a* depicts techniques for adjusting a coverage area of a communication beam based on a changing position of a terminal using the communication beam. In some examples, the communications network adjusts the coverage area of communication beam 617 based on the position of first terminal 620-1 changing, which may be referred to as beam tracking. In some examples, based on a change in the position of first terminal 620-1 (e.g., by more than a threshold distance), the communications network may determine updated beam coefficients for communication beam 617, which may result in communication beam 617 having beam coverage area 660-b. Beam coverage area 660-b may encompass the latest position of first terminal 620-1 and signals received from first terminal using communication beam 617 may be receiving using the updated beam coefficients.

In some examples, first terminal 620-1 may periodically transmit channel sounding probes. The communications network may use the channel sounding probes to keep track of a position of first terminal 620-1. In some examples, the communications network may use the tracked position of first terminal 620-1 to determine when to update a coverage area of communication beam 617 and for determining the updated set of beam coefficients.

In some examples, the adjusted coverage area of communication beam 617 may no longer encompass a second terminal that was previously encompassed by the original coverage area of communication beam 617—e.g., based on communication beam 617 being used to track first terminal 620-1, which may be referred to as a reference terminal. For example, beam coverage area 660-b may not encompass second terminal 620-2. In other examples, a terminal within the original coverage area of communication beam 617 may move outside of the original coverage area. Techniques for managing communications with terminals that leave a coverage area of a communication beam or are left by the coverage area of the communication beam are described in more detail herein.

Figure 7A:
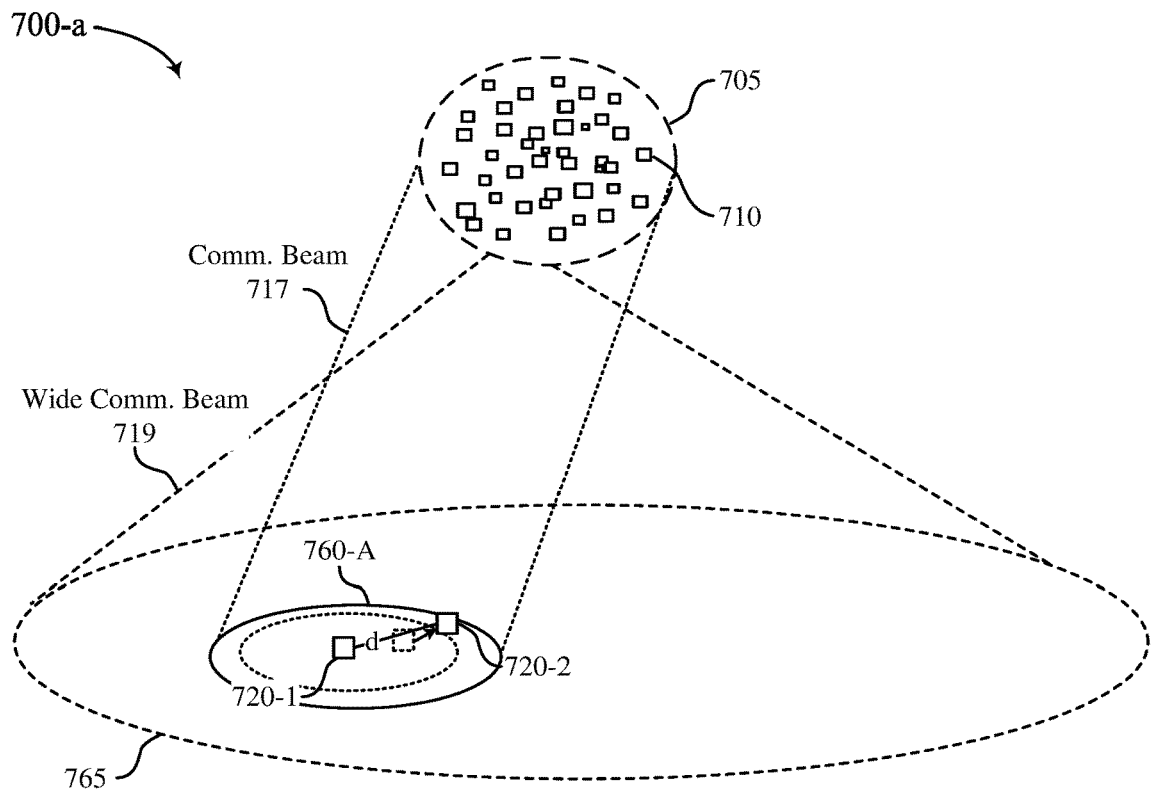

FIG. 7A shows a communications subsystem that supports beam management using sparse antenna arrays in accordance with examples described herein.

Communications subsystem 700-a depicts techniques for adjusting a coverage area of a communication beam based on a changing position of a terminal using the communication beam. In some examples, the communications network adjusts the coverage area of communication beam 717 based on the position of second terminal 720-2 changing.

In some examples, second terminal 720-2 may move outside of an original coverage area of communication beam 717. In some examples, the communications network may determine that second terminal 720-2 has moved outside of the original coverage area and may adjust a size of the coverage area of communication beam 717 to continue providing service to second terminal 720-2. In some examples, the communications network determines updated beam coefficients that increase a coverage area of communication beam 717, resulting in beam coverage area 760-a that includes the position of first terminal 720-1 and second terminal 720-2.

Despite increasing the coverage area of communication beam 717 to encompass second terminal 720-2, communication beam 717 may stay focused on and track the position of first terminal 720-1, which may be referred to as the reference terminal for communication beam 717. Accordingly, in some examples, adjustments for the coverage area of communication beam 717 may be limited based on movements of other terminals, such as second terminal 720-2, to maintain an acceptable service level for first terminal 720-1.

Figure 7B:
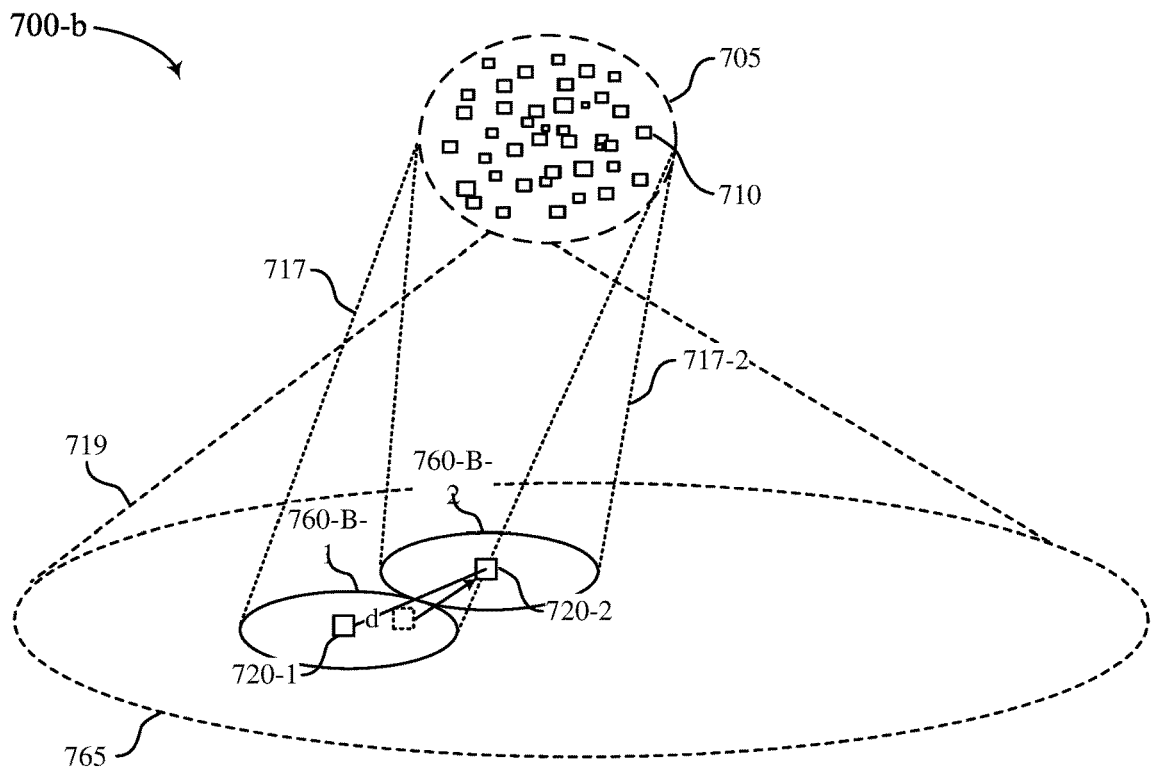

FIG. 7B shows a communications subsystem that supports beam management using sparse antenna arrays in accordance with examples described herein.

Communications subsystem 700-b depicts techniques for adjusting a coverage area of a communication beam based on a changing position of a terminal using the communication beam. In some examples, the communications network adjusts the coverage area of communication beam 717 based on the position of second terminal 720-2 changing. In some examples, second terminal 720-2 may move outside of an original coverage area (e.g., first beam coverage area 760-b-1) of communication beam 717. In some examples, the communications network may determine that second terminal 720-2 has moved outside of the original coverage area and form second communication beam 717-2 having second beam coverage area 760-b-2.

In some examples, second terminal 720-2 may be the reference terminal for second communication beam 717-2, while first terminal 720-1 may be the reference terminal for communication beam 717. Accordingly, in some examples, the communications network may adjust the coverage area of second communication beam 717-2 based on the current position of second terminal 720-2—e.g., using beam tracking techniques.

Additionally, or alternatively, communications subsystem 700-b may depict techniques for adjusting a coverage area of a communication beam based on the utilization of the communication beam exceeding a threshold. In some examples, based on determining that the utilization of communication beam 717 has exceeded a threshold, the communications network may identify second terminal 720-2 as a reference terminal for a new communication beam, second communication beam 717-2. Based on forming second communication beam 717-2, the communications network may center communication beam 717 over first terminal 720-1 and may center second communication beam 717-2 over second terminal 720-2.

In other examples, based on determining that the utilization of wide communication beam 719 has reached a threshold, the communications network may identify second terminal 720-2 as a reference terminal for a new communication beam—e.g., to further increase the capacity of the communications system for servicing the geographic region covered by wide coverage area 765.

In some examples, when second communication beam 717-2 is formed, the communications network may manage the resources assigned to the different communication beams. For example, the communications network may allocate communication resources to second communication beam 717-2 that are orthogonal to the resources assigned to communication beam 717—e.g., if second beam coverage area 760-b-2 overlaps with first beam coverage area 760-b-1. Or the communications network may change the resources allocated to communication beam 717 to be orthogonal to the communication resources allocated to second communication beam 717-2. In some examples, if the second beam coverage area 760-b-2 moves a certain distance away from first beam coverage area 760-b-1 (e.g., such that the beam coverage areas are no longer overlapping), overlapping resources may be assigned to communication beam 717 and second communication beam 717-2.

Figure 8:
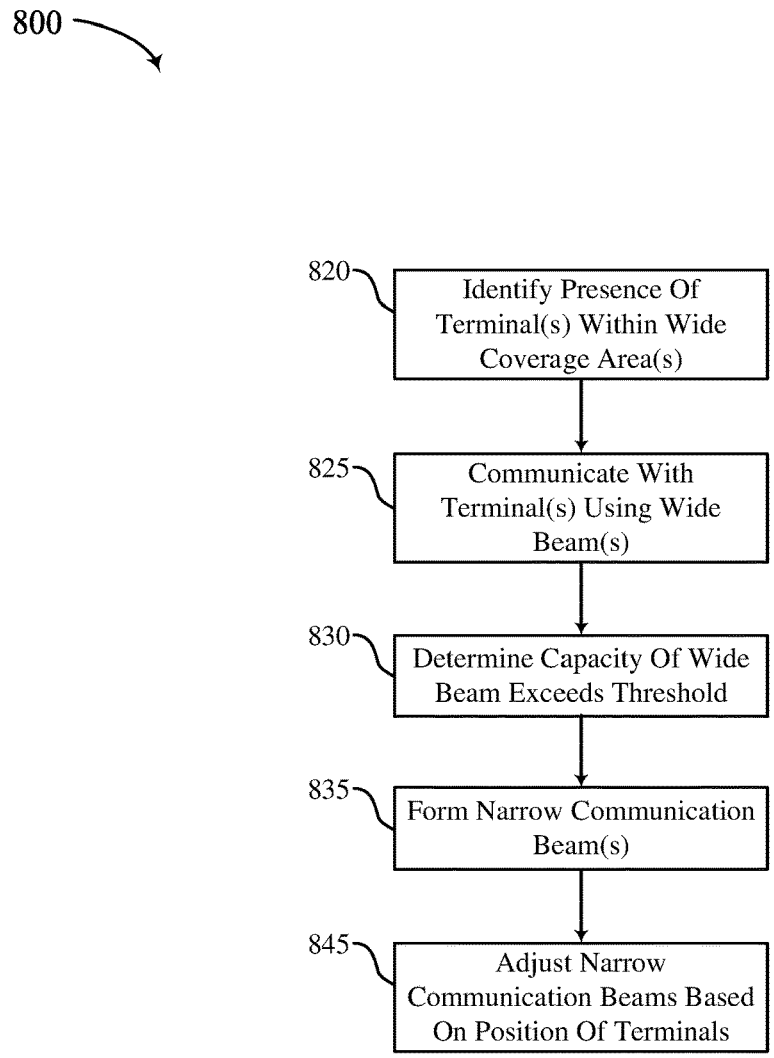
FIGS. 8 and 9 show examples of sets of operations for beam management using sparse antenna arrays in accordance with examples described herein.

FIG. 8 shows an example set of operations for beam management using sparse antenna arrays in accordance with examples described herein.

Flowchart 800 may be performed by a communications network (e.g., a satellite network), which may be examples of a communications system or subsystem described above with reference to FIGS. 1 through 8. In some examples, flowchart 800 illustrates an exemplary sequence of operations performed to support beam management using sparse antenna arrays. For example, flowchart 800 depicts operations for activating narrow communication beams based on capacity parameters, for tracking terminals using communication beams, and for adjusting communication beams based on terminal movement.

One or more of the operations described in flowchart 800 may be performed earlier or later in the process, omitted, replaced, supplemented, or combined with another operation. Also, additional operations described herein may be included in flowchart 800.

At 820, the communications network may identify a presence of one or more terminals within one or more wide coverage areas of one or more wide communication beams. In some examples, the communications network identifies the presence of the one or more terminals based on preambles transmitted from the one or more terminals. The preambles may be received using one or more discovery beams. In some examples, the discovery areas of the discovery beams overlap with the coverage areas of the wide communication beams having similar boundaries. In other examples, the discovery areas of the discovery beams are different than the coverage areas of the wide communication beams e.g., having different diameters, different patterns, etc. In some examples, the communications network may determine a position (e.g., a rough position) of the terminals based on receiving the preambles using the discovery beams—e.g., based on positioning information included in the preambles, the boundaries of the discovery beam used to receive the preamble, etc.

At 825, the communications network may communicate with the one or more terminals using the one or more wide communication beams. Within each wide communication beam, the communications network may communicate with multiple terminals. In some examples, the communications network determines which wide communications beams to use to communicate with which terminals based on the positioning information determined for the terminals. For example, the communications network may use a wide communication beam having a wide coverage area with boundaries that overlap with the boundaries of the discovery area of the discovery beam used to receive the preamble.

At 830, the communications network may determine that a utilization of one or more wide communication beams has reached a threshold (e.g., greater than 80% or 90% capacity)—e.g., based on a quantity of terminals within the wide coverage area, service levels of the terminals within the wide coverage area, historical usage by the terminals within the wide coverage area, or a combination thereof.

At 835, the communications network may form one or more narrow communication beams within the one or more wide communications beams that have reached a capacity threshold. In some examples, the communications network forms one or more narrow communication beams within a wide communication beam, such that centers of the beam coverage areas of the one or more narrow communication beams are within the boundaries of a wide coverage area of the wide communication beam. In some examples, the one or more narrow communication beams may be region-specific (e.g., formed to cover regions of high density of terminals), terminal-specific (e.g., formed to track a specific terminal), or some combination thereof. In some examples, the time, frequency, and polarization resources of the narrow beams within a wide communication beam are orthogonal to the time, frequency, and polarization resources of the wide communication beam. In some examples, the communications network simultaneously operates a wide communication beam and one or more narrow communication beams within the wide communication beam, the one or more narrow communication beams supplementing the capacity of the wide communication beam. In other examples, the communications network alternatively operates (e.g., in time) the wide communication beam or the one or more narrow communication beams to serve the geographic region covered by the wide coverage area. Thus, the communications network may reserve a set of communication resources (e.g., time, frequency, or polarization resources) across the wide coverage area for control signaling, such as preamble transmissions, channel sounding probe transmission, etc.

In some examples, forming the one or more narrow communication beams includes positioning the one or more narrow communications beams so that a quality of signals received from reference terminals associated with the one or more narrow communication beams are increased. For example, the communications system may dither a narrow communication beam around a rough position of a reference terminal for the narrow communication beam and select a beam coverage area for the narrow communication beam that is associated with signals received from the reference terminal having a highest quality.

At 840, the communications network may adjust the narrow communication beam based on the position of the reference terminals within the one or more wide coverage areas. In some examples, the communications network may adjust the beam coverage areas of the one or more narrow communication beams based on movements of the corresponding reference terminals. For example, for a narrow communication beam that corresponds to a reference terminal, the communications network may adjust the coverage area of the communication beam to accommodate for movements by the reference terminal—e.g., using beam tracking techniques, such as enlarging the narrow communication beam, moving the narrow communication beam, etc.

Additionally, or alternatively, the communications network may form additional narrow communication beams based on the changing position of the reference terminals. The additional narrow communication beams may be linked with additional reference terminals.

Figure 9:
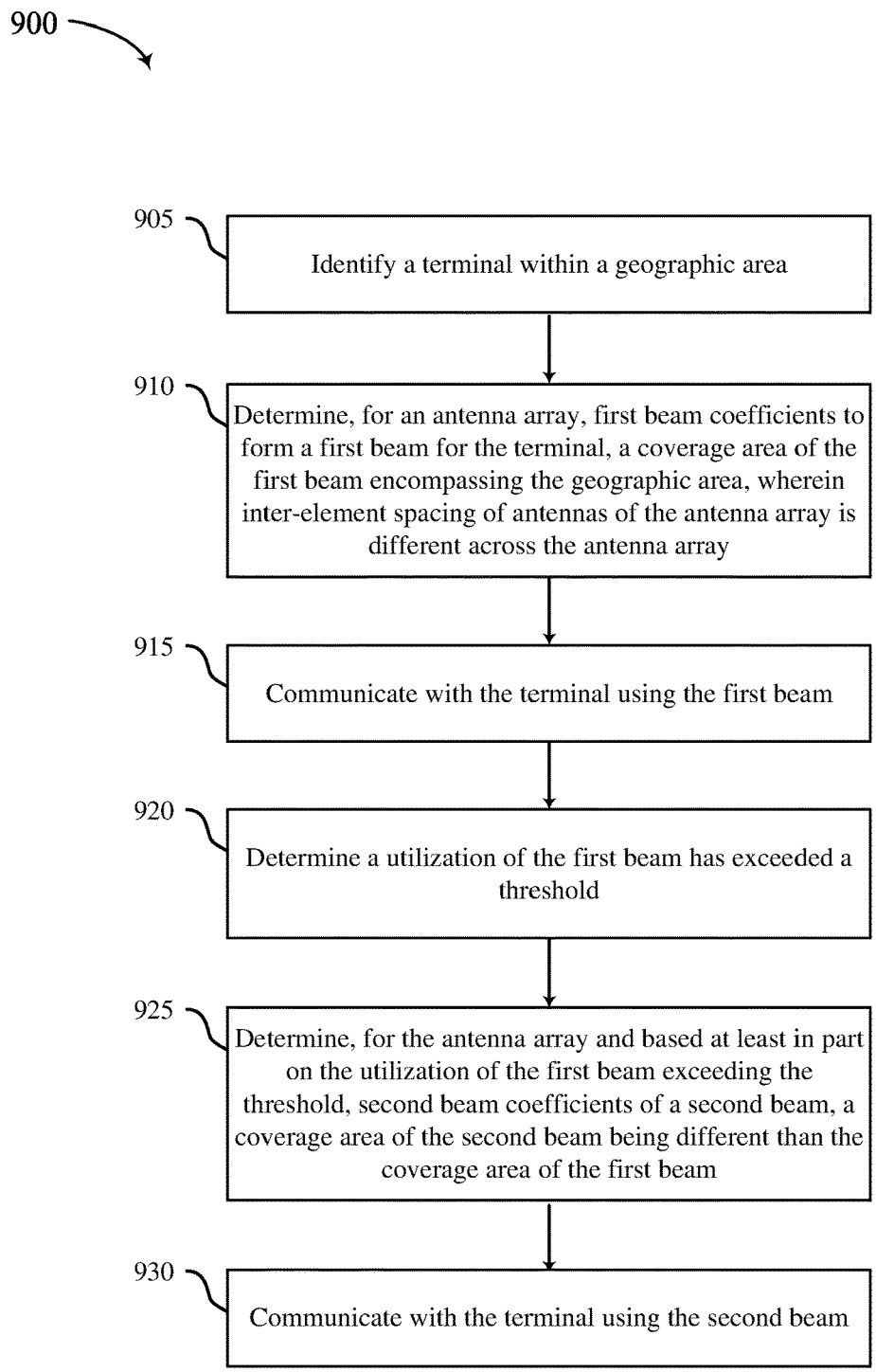

FIG. 9 shows an example set of operations for beam management using sparse antenna arrays in accordance with examples described herein. Method 900 may be performed by components of an antenna array, ground system, or a combination thereof, which may be examples of a communications network (or components thereof) described with reference to FIGS. 1 and 2. In some examples, a communications network may execute a set of instructions to control the functional elements of the communications network to perform the described functions. Additionally, or alternatively, the communications network may perform aspects of the described functions using special-purpose hardware.

At 905, method 900 may include identifying a terminal within a geographic area. The operations of 905 may be performed in accordance with examples as disclosed herein. In some examples, aspects of the operations of 905 may be performed by a signal detector, as described herein and with reference to FIG. 2.

At 910, method 900 may include determining, for an antenna array, first beam coefficients to form a first beam for the terminal, a coverage area of the first beam encompassing the geographic area, wherein inter-element spacing of antennas of the antenna array is different across the antenna array. The operations of 910 may be performed in accordance with examples as disclosed herein. In some examples, aspects of the operations of 910 may be performed by a beam manager, as described as described herein and with reference to FIG. 2.

At 915, method 900 may include communicating with the terminal using the first beam. The operations of 915 may be performed in accordance with examples as disclosed herein. In some examples, aspects of the operations of 915 may be performed by a communications manager, as described as described herein and with reference to FIG. 2.

At 920, method 900 may include determining a utilization of the first beam has exceeded a threshold. The operations of 920 may be performed in accordance with examples as disclosed herein. In some examples, aspects of the operations of 920 may be performed by a beam manager, communications manager, or both, as described as described herein and with reference to FIG. 2.

At 925, method 900 may include determining, for the antenna array and based at least in part on the utilization of the first beam exceeding the threshold, second beam coefficients of a second beam, a coverage area of the second beam being different than the coverage area of the first beam. The operations of 925 may be performed in accordance with examples as disclosed herein. In some examples, aspects of the operations of 925 may be performed by a beam manager, as described as described herein and with reference to FIG. 2.

At 930, method 900 may include communicating with the terminal using the second beam. The operations of 930 may be performed in accordance with examples as disclosed herein. In some examples, aspects of the operations of 930 may be performed by a communications manager, as described as described herein and with reference to FIG. 2.

In some examples, an apparatus as described herein may perform a method or methods, such as the method 900. The apparatus may include, features, circuitry, logic, means, or instructions (e.g., a non-transitory computer-readable medium storing instructions executable by a processor) for identifying a terminal within a geographic region; determining, for an antenna array, first beam coefficients to form a first beam for the terminal, a coverage area of the first beam encompassing the geographic region, wherein inter-element spacing of antennas of the antenna array is different across the antenna array; communicating with the terminal using the first beam; determining a utilization of the first beam has exceeded a threshold; determining, for the antenna array and based at least in part on the utilization of the first beam exceeding the threshold, second beam coefficients of a second beam, a coverage area of the second beam being different than the coverage area of the first beam; and communicating with the terminal using the second beam.

In some examples, the apparatus may include, features, circuitry, logic, means, or instructions for forming the first beam based at least in part on the first beam coefficients, wherein the coverage area of the second beam has a center that is within the coverage area of the first beam.

In some examples, the apparatus may include, features, circuitry, logic, means, or instructions for identifying a plurality of terminals within the geographic region, the plurality of terminals comprising the terminal; and communicating with the plurality of terminals using the first beam, wherein the utilization of the first beam is determined as exceeding the threshold based at least in part on communicating with the plurality of terminals.

In some examples, a gain of the first beam is lower than a gain of the second beam.

In some examples, the apparatus may include, features, circuitry, logic, means, or instructions for identifying a plurality of terminals within the geographic region, the plurality of terminals comprising the terminal; and determining, for the antenna array, a plurality of beam coefficients to form a plurality of beams for the plurality of terminals having respective coverage areas with respective centers within the coverage area of the first beam, wherein the respective coverage areas of the plurality of beams correspond to respective positions of the plurality of terminals, and wherein the plurality of beam coefficients comprises the second beam coefficients.

In some examples, the apparatus may include, features, circuitry, logic, means, or instructions for reserving communication resources in the first beam for identifying additional terminals within the geographic region.

In some examples, the coverage area of the second beam corresponds to a position of the terminal, and the apparatus may include, features, circuitry, logic, means, or instructions for identifying a second terminal within the geographic region; and determining, for the antenna array, third beam coefficients to form a third beam for the second terminal, a coverage area of the third beam corresponding to a position of the second terminal.

In some examples, the apparatus may include, features, circuitry, logic, means, or instructions for receiving first positioning information for the terminal and second positioning information for the second terminal based at least in part on identifying the terminal and the second terminal, wherein the second beam coefficients and the third beam coefficients are determined based at least in part on the first positioning information and the second positioning information.

In some examples, the apparatus may include, features, circuitry, logic, means, or instructions for receiving first reference signals from the terminal and second reference signals from the second terminal based at least in part on identifying the terminal and the second terminal, wherein the second beam coefficients and the third beam coefficients are determined based at least in part on the first reference signals and the second reference signals.

In some examples, the apparatus may include, features, circuitry, logic, means, or instructions for communicating with the second terminal using the third beam, wherein communicating with the terminal using the second beam and with the second terminal using the third beam comprises: detecting a signal at the antenna array, the detected signal comprising respective components of a first signal transmitted from the terminal and detected at the antenna array and respective components of a second signal transmitted from the second terminal and detected at the antenna array; and applying the second beam coefficients to the detected signal to obtain a first beam signal for the terminal and the third beam coefficients to the detected signal to obtain a second beam signal for the second terminal.

In some examples, the apparatus may include, features, circuitry, logic, means, or instructions for determining a position of the antennas of the antenna array based at least in part on a first signal received from a first transmitter, a second signal received from a second transmitter, the position of the first transmitter, and the position of the second transmitter.

In some examples, the coverage area of the second beam corresponds to a position of the terminal, and the apparatus may include, features, circuitry, logic, means, or instructions for determining, for the antenna array and based at least in part on forming the second beam, third beam coefficients to adjust the coverage area of the second beam, an adjusted coverage area of the second beam corresponding to a second position of the terminal.

In some examples, the coverage area of the second beam has a first size based at least in part on the second beam coefficients and the adjusted coverage area of the beam has a second size based at least in part on the third beam coefficients.

In some examples, the apparatus may include, features, circuitry, logic, means, or instructions for identifying a second terminal within the coverage area of the second beam, wherein a position of the terminal is a first distance from a position of the second terminal; and determining, for the antenna array and based at least in part on identifying the second terminal, third beam coefficients associated with an adjusted coverage area of the second beam that is based at least in part on the position of the second terminal.

In some examples, the apparatus may include, features, circuitry, logic, means, or instructions for identifying a second terminal within the coverage area of the second beam, wherein a position of the terminal is a first distance from a position of the second terminal; determining a change in a distance between the position of the terminal and the position of the second terminal; and determining, for the antenna array, third beam coefficients that adjust a size of the coverage area of the second beam based at least in part on the change in the distance.

In some examples, the apparatus may include, features, circuitry, logic, means, or instructions for identifying a second terminal within the coverage area of the second beam, wherein a position of the terminal is a first distance from a position of the second terminal; determining a change in a distance between the position of the terminal and the position of the second terminal; determining, for the antenna array, third beam coefficients to form a third beam for the second terminal, a coverage area of the third beam corresponding to the position of the second terminal.

In some examples, the apparatus may include, features, circuitry, logic, means, or instructions for identifying a second terminal within the coverage area of the second beam; and communicating with the second terminal using the second beam.

In some examples, the apparatus may include, features, circuitry, logic, means, or instructions for applying, to a signal detected at the antenna array based at least in part on determining the first beam coefficients, a plurality of sets of beam coefficients, wherein a plurality of coverage areas are formed for the second beam in accordance with the plurality of sets of beam coefficients, each coverage area of the plurality of coverage areas covering a different geographic region, wherein the plurality of coverage areas comprises the coverage area of the second beam and the plurality of sets of beam coefficients comprises the second beam coefficients; determining, for each coverage area of the plurality of coverage areas, a signal quality of a signal transmitted from the terminal and received in respective beam signals associated with the plurality of sets of beam coefficients; and selecting the second beam coefficients based at least in part on the signal quality of the signal received according to the second beam coefficients relative to the signal quality of the signal received according to other sets of beam coefficients of the plurality of sets of beam coefficients.

In some examples, the signal quality of the signal is determined based at least in part on bit error rates of the signal, signal-to-noise ratios of the signal, signal-to-interference-plus-noise ratios of the signal, or a combination thereof.

In some examples, a system as described herein may perform a method or methods, such as the method 900. The system may include a signal detector configured to identify a terminal within a geographic region; a beam manager determine, for an antenna array, first beam coefficients to form a first beam for the terminal, a coverage area of the first beam encompassing the geographic region, wherein inter-element spacing of antennas of the antenna array is different across the antenna array; a communications manager configured to communicate with the terminal using the first beam and determine a utilization of the first beam has exceeded a threshold, wherein the beam manager is further configured to determine, for the antenna array and based at least in part on the utilization of the first beam exceeding the threshold, second beam coefficients, and the communications manager is further configured to communicate with the terminal using the second beam.

In some examples of the system, the beam manager is further configured to form the first beam based at least in part on the first beam coefficients, wherein the coverage area of the second beam has a center that is within the coverage area of the first beam.

In some examples of the system, the signal detector is further configured to identify a plurality of terminals within the geographic region, the plurality of terminals comprising the terminal, and the communications manager is further configured to communicate with the plurality of terminals using the first beam, wherein the utilization of the first beam is determined as exceeding the threshold based at least in part on communicating with the plurality of terminals.

In some examples of the system, the signal detector is further configured to identify a plurality of terminals within the geographic region, the plurality of terminals comprising the terminal, and the beam manager is further configured to determine, for the antenna array, a plurality of beam coefficients to form a plurality of beams for the plurality of terminals having respective coverage areas with respective centers within the coverage area of the first beam, wherein the respective coverage areas of the plurality of beams correspond to respective positions of the plurality of terminals, and wherein the plurality of beam coefficients comprises the second beam coefficients.

In some examples of the system, the communications manager is further configured to reserve communication resources in the first beam for identifying additional terminals within the geographic region.

In some examples of the system, the coverage area of the second beam corresponds to a position of the terminal, the signal detector is further configured to identify a second terminal within the geographic region, and the beam manager is further configured to determine, for the antenna array, third beam coefficients to form a third beam for the second terminal, a coverage area of the third beam corresponding to a position of the second terminal.

In some examples, the system includes a positioning component configured to determine a position of the antennas of the antenna array based at least in part on a first signal received from a first transmitter, a second signal received from a second transmitter, the position of the first transmitter, and the position of the second transmitter.

In some examples of the system, the coverage area of the second beam corresponds to a position of the terminal, and the beam manager is further configured to determine, for the antenna array and based at least in part on forming the second beam, third beam coefficients to adjust the coverage area of the second beam, an adjusted coverage area of the second beam corresponding to a second position of the terminal.

In some examples of the system, the signal detector is further configured to identify a second terminal within the coverage area of the second beam, wherein a position of the terminal is a first distance from a position of the second terminal, and the beam manager is further configured to determine, for the antenna array and based at least in part on identifying the second terminal, third beam coefficients associated with an adjusted coverage area of the second beam that is based at least in part on the position of the second terminal.

In some examples of the system, the signal detector is further configured to identify a second terminal within the coverage area of the second beam, wherein a position of the terminal is a first distance from a position of the second terminal. The system may also include a positioning component configured to determine a change in a distance between the position of the terminal and the position of the second terminal, wherein the beam manager is further configured to determine, for the antenna array, third beam coefficients that adjust a size of the coverage area of the second beam based at least in part on the change in the distance.

In some examples of the system, the signal detector is further configured to identify a second terminal within the coverage area of the second beam, wherein a position of the terminal is a first distance from a position of the second terminal. The system may also include a positioning component configured to determine a change in a distance between the position of the terminal and the position of the second terminal, wherein the beam manager is further configured to determine, for the antenna array, third beam coefficients to form a third beam for the second terminal, a coverage area of the third beam corresponding to the position of the second terminal.

In some examples of the system, the signal detector is further configured to identify a second terminal within the coverage area of the second beam; and the communications manager is further configured to communicate with the second terminal using the second beam.

In some examples of the system, the beam manager is further configured to apply, to a signal detected at the antenna array based at least in part on determining the first beam coefficients, a plurality of sets of beam coefficients, wherein a plurality of coverage areas are formed for the second beam in accordance with the plurality of sets of beam coefficients, each coverage area of the plurality of coverage areas covering a different geographic region, wherein the plurality of coverage areas comprises the coverage area of the second beam and the plurality of sets of beam coefficients comprises the second beam coefficients; the signal detector is further configured to determine, for each coverage area of the plurality of coverage areas, a signal quality of a signal transmitted from the terminal and received in respective beam signals associated with the plurality of sets of beam coefficients; and the beam manager is further configured to select the second beam coefficients based at least in part on the signal quality of the signal received according to the second beam coefficients relative to the signal quality of the signal received according to other sets of beam coefficients of the plurality of sets of beam coefficients.

It should be noted that these methods describe examples of implementations, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read-only memory (EEPROM), flash memory, compact disk read-only memory (CDROM) or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method of communication, comprising:
   identifying a terminal within a geographic region;
   determining positions of antennas of an antenna array implemented on one or more satellites based at least in part on a first signal received from a first transmitter, a second signal received from a second transmitter, a position of the first transmitter, and a position of the second transmitter, wherein the antennas of the antenna array are deployed in a space orbit, and wherein a distance between adjacent antennas of the antenna array is different across the antenna array;
   determining, for the antenna array, first beam coefficients to form a first beam for the terminal, a coverage area of the first beam encompassing the geographic region;
   communicating with the terminal using the first beam;
   determining a utilization of the first beam has exceeded a threshold;
   determining, for the antenna array and based at least in part on the utilization of the first beam exceeding the threshold, second beam coefficients of a second beam based at least in part on a position of the terminal and the positions of the antennas relative to the terminal, a coverage area of the second beam being different than the coverage area of the first beam; and
   communicating with the terminal using the second beam.

2. The method of claim 1, further comprising:
   forming the first beam based at least in part on the first beam coefficients, wherein the coverage area of the second beam has a center that is within the coverage area of the first beam.

3. The method of claim 1, further comprising:
   identifying a plurality of terminals within the geographic region, the plurality of terminals comprising the terminal; and
   communicating with the plurality of terminals using the first beam, wherein the utilization of the first beam is determined as exceeding the threshold based at least in part on communicating with the plurality of terminals.

4. The method of claim 1, wherein a gain of the first beam is lower than a gain of the second beam.

5. The method of claim 1, further comprising:
   identifying a plurality of terminals within the geographic region, the plurality of terminals comprising the terminal; and
   determining, for the antenna array, a plurality of beam coefficients to form a plurality of beams for the plurality of terminals having respective coverage areas with respective centers within the coverage area of the first beam, wherein the respective coverage areas of the plurality of beams correspond to respective positions of the plurality of terminals, and wherein the plurality of beam coefficients comprises the second beam coefficients.

6. The method of claim 1, further comprising:
   reserving communication resources in the first beam for identifying additional terminals within the geographic region.

7. The method of claim 1, wherein the coverage area of the second beam corresponds to a position of the terminal, the method further comprising:
   identifying a second terminal within the geographic region; and
   determining, for the antenna array, third beam coefficients to form a third beam for the second terminal, a coverage area of the third beam corresponding to a position of the second terminal.

8. The method of claim 7, further comprising:
   receiving first positioning information for the terminal and second positioning information for the second terminal based at least in part on identifying the terminal and the second terminal,
   wherein the second beam coefficients and the third beam coefficients are determined based at least in part on the first positioning information and the second positioning information.

9. The method of claim 7, further comprising:
   receiving first reference signals from the terminal and second reference signals from the second terminal based at least in part on identifying the terminal and the second terminal,
   wherein the second beam coefficients and the third beam coefficients are determined based at least in part on the first reference signals and the second reference signals.

10. The method of claim 7, further comprising:
    communicating with the second terminal using the third beam, wherein communicating with the terminal using the second beam and with the second terminal using the third beam comprises:
    detecting a signal at the antenna array, the detected signal comprising respective components of a first signal transmitted from the terminal and detected at the antenna array and respective components of a second signal transmitted from the second terminal and detected at the antenna array; and applying the second beam coefficients to the detected signal to obtain a first beam signal for the terminal and the third beam coefficients to the detected signal to obtain a second beam signal for the second terminal.

11. The method of claim 1, wherein the coverage area of the second beam corresponds to a position of the terminal, the method further comprising:

determining, for the antenna array and based at least in part on forming the second beam, third beam coefficients to adjust the coverage area of the second beam, an adjusted coverage area of the second beam corresponding to a second position of the terminal.

12. The method of claim 11, wherein the coverage area of the second beam has a first size based at least in part on the second beam coefficients and the adjusted coverage area of the second beam has a second size based at least in part on the third beam coefficients.

13. The method of claim 1, further comprising:

identifying a second terminal within the coverage area of the second beam, wherein a position of the terminal is a first distance from a position of the second terminal; and determining, for the antenna array and based at least in part on identifying the second terminal, third beam coefficients associated with an adjusted coverage area of the second beam that is based at least in part on the position of the second terminal.

14. The method of claim 1, further comprising:

identifying a second terminal within the coverage area of the second beam, wherein a position of the terminal is a first distance from a position of the second terminal;

determining a change in a distance between the position of the terminal and the position of the second terminal; and determining, for the antenna array, third beam coefficients that adjust a size of the coverage area of the second beam based at least in part on the change in the distance.

15. The method of claim 1, further comprising:

identifying a second terminal within the coverage area of the second beam, wherein a position of the terminal is a first distance from a position of the second terminal;

determining a change in a distance between the position of the terminal and the position of the second terminal; and determining, for the antenna array, third beam coefficients to form a third beam for the second terminal, a coverage area of the third beam corresponding to the position of the second terminal.

16. The method of claim 1, further comprising:

identifying a second terminal within the coverage area of the second beam, wherein the coverage area of the second beam is smaller than the coverage area of the first beam; and communicating with the second terminal using the second beam.

17. The method of claim 1, further comprising:

applying, to a signal detected at the antenna array based at least in part on determining the first beam coefficients, a plurality of sets of beam coefficients, wherein a plurality of coverage areas are formed for the second beam in accordance with the plurality of sets of beam coefficients, each coverage area of the plurality of coverage areas covering a different geographic region, wherein the plurality of coverage areas comprises the coverage area of the second beam and the plurality of sets of beam coefficients comprises the second beam coefficients;

determining, for each coverage area of the plurality of coverage areas, a signal quality of a signal transmitted from the terminal and received in respective beam signals associated with the plurality of sets of beam coefficients; and selecting the second beam coefficients based at least in part on the signal quality of the signal received according to the second beam coefficients relative to the signal quality of the signal received according to other sets of beam coefficients of the plurality of sets of beam coefficients.

18. The method of claim 17, wherein the signal quality of the signal is determined based at least in part on bit error rates of the signal, signal-to-noise ratios of the signal, signal-to-interference-plus-noise ratios of the signal, or a combination thereof.

19. A communications network, comprising:

a signal detector configured to identify a terminal within a geographic region;

a positioning component configured to determine positions of antennas of an antenna array implemented on one or more satellites based at least in part on a first signal received from a first transmitter, a second signal received from a second transmitter, a position of the first transmitter, and a position of the second transmitter, wherein the antennas of the antenna array are deployed in a space orbit, and wherein a distance between adjacent antennas of the antenna array is different across the antenna array;

a beam manager configured to determine, for an antenna array, first beam coefficients to form a first beam for the terminal, a coverage area of the first beam encompassing the geographic region; and a communications manager configured to communicate with the terminal using the first beam and determine a utilization of the first beam has exceeded a threshold, wherein the beam manager is further configured to determine, for the antenna array and based at least in part on the utilization of the first beam exceeding the threshold, second beam coefficients of a second beam based at least in part on a position of the terminal and the positions of the antennas relative to the terminal, a coverage area of the second beam being different than the coverage area of the first beam, and wherein the communications manager is further configured to communicate with the terminal using the second beam.

20. The communications network of claim 19, wherein:

the beam manager is further configured to form the first beam based at least in part on the first beam coefficients, wherein the coverage area of the second beam has a center that is within the coverage area of the first beam.

21. The communications network of claim 19, wherein:

the signal detector is further configured to identify a plurality of terminals within the geographic region, the plurality of terminals comprising the terminal, and the communications manager is further configured to communicate with the plurality of terminals using the first beam, wherein the utilization of the first beam is determined as exceeding the threshold based at least in part on communicating with the plurality of terminals.

22. The communications network of claim 19, wherein:
the signal detector is further configured to identify a plurality of terminals within the geographic region, the plurality of terminals comprising the terminal, and
the beam manager is further configured to determine, for the antenna array, a plurality of beam coefficients to form a plurality of beams for the plurality of terminals having respective coverage areas with respective centers within the coverage area of the first beam, wherein the respective coverage areas of the plurality of beams correspond to respective positions of the plurality of terminals, and wherein the plurality of beam coefficients comprises the second beam coefficients.

23. The communications network of claim 19, wherein:
the communications manager is further configured to reserve communication resources in the first beam for identifying additional terminals within the geographic region.

24. The communications network of claim 19, wherein:
the coverage area of the second beam corresponds to a position of the terminal,
the signal detector is further configured to identify a second terminal within the geographic region, and
the beam manager is further configured to determine, for the antenna array, third beam coefficients to form a third beam for the second terminal, a coverage area of the third beam corresponding to a position of the second terminal.

25. The communications network of claim 19, wherein:
the coverage area of the second beam corresponds to a position of the terminal, and
the beam manager is further configured to determine, for the antenna array and based at least in part on forming the second beam, third beam coefficients to adjust the coverage area of the second beam, an adjusted coverage area of the second beam corresponding to a second position of the terminal.

26. The communications network of claim 19, wherein:
the signal detector is further configured to identify a second terminal within the coverage area of the second beam, wherein a position of the terminal is a first distance from a position of the second terminal, and
the beam manager is further configured to determine, for the antenna array and based at least in part on identifying the second terminal, third beam coefficients associated with an adjusted coverage area of the second beam that is based at least in part on the position of the second terminal.

27. The communications network of claim 19, wherein:
the signal detector is further configured to identify a second terminal within the coverage area of the second beam, wherein a position of the terminal is a first distance from a position of the second terminal, and
the positioning component is further configured to determine a change in a distance between the position of the terminal and the position of the second terminal, wherein the beam manager is further configured to determine, for the antenna array, third beam coefficients that adjust a size of the coverage area of the second beam based at least in part on the change in the distance.

28. The communications network of claim 19, wherein:
the signal detector is further configured to identify a second terminal within the coverage area of the second beam, wherein a position of the terminal is a first distance from a position of the second terminal, and
the positioning component is further configured to determine a change in a distance between the position of the terminal and the position of the second terminal, wherein the beam manager is further configured to determine, for the antenna array, third beam coefficients to form a third beam for the second terminal, a coverage area of the third beam corresponding to the position of the second terminal.

29. The communications network of claim 19, wherein:
the signal detector is further configured to identify a second terminal within the coverage area of the second beam, wherein the coverage area of the second beam is smaller than the coverage area of the first beam; and
the communications manager is further configured to communicate with the second terminal using the second beam.

30. The communications network of claim 19, wherein:
the beam manager is further configured to apply, to a signal detected at the antenna array based at least in part on determining the first beam coefficients, a plurality of sets of beam coefficients, wherein a plurality of coverage areas are formed for the second beam in accordance with the plurality of sets of beam coefficients, each coverage area of the plurality of coverage areas covering a different geographic region, wherein the plurality of coverage areas comprises the coverage area of the second beam and the plurality of sets of beam coefficients comprises the second beam coefficients;
the signal detector is further configured to determine, for each coverage area of the plurality of coverage areas, a signal quality of a signal transmitted from the terminal and received in respective beam signals associated with the plurality of sets of beam coefficients; and
the beam manager is further configured to select the second beam coefficients based at least in part on the signal quality of the signal received according to the second beam coefficients relative to the signal quality of the signal received according to other sets of beam coefficients of the plurality of sets of beam coefficients.

* * * * *